(12) United States Patent
Lee

(10) Patent No.: US 7,876,784 B1
(45) Date of Patent: Jan. 25, 2011

(54) METHODS AND APPARATUS FOR PROVIDING RECEIVERS FOR USE IN SUPERPOSITION CODED MULTI-USER SYSTEMS

(75) Inventor: Jungwon Lee, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 337 days.

(21) Appl. No.: 12/193,477

(22) Filed: Aug. 18, 2008

Related U.S. Application Data

(60) Provisional application No. 60/975,627, filed on Sep. 27, 2007.

(51) Int. Cl.
*H04J 3/24* (2006.01)
(52) U.S. Cl. .............. 370/473; 370/203; 370/208; 370/310; 375/142; 375/260; 375/343
(58) Field of Classification Search ............ None
See application file for complete search history.

(56) References Cited

U.S. PATENT DOCUMENTS

| | | | |
|---|---|---|---|
| 7,376,106 B2 * | 5/2008 | Ben-David et al. ......... 370/335 |
| 7,464,166 B2 * | 12/2008 | Larsson et al. ............ 709/228 |
| 2002/0146078 A1 * | 10/2002 | Gorokhov et al. .......... 375/260 |
| 2002/0159533 A1 * | 10/2002 | Crawford .................. 375/260 |
| 2004/0114675 A1 * | 6/2004 | Crawford .................. 375/149 |
| 2004/0205105 A1 * | 10/2004 | Larsson et al. ............ 709/200 |
| 2005/0111564 A1 * | 5/2005 | Kramer et al. ............. 375/265 |
| 2007/0036246 A1 * | 2/2007 | Hammerschmidt .......... 375/340 |
| 2010/0091798 A1 * | 4/2010 | Bhushan et al. ........... 370/474 |

* cited by examiner

*Primary Examiner*—Pankaj Kumar
*Assistant Examiner*—Ajay P Cattungal

(57) ABSTRACT

Methods and apparatus provide low-complexity receivers for use in superposition coded multi-user systems. In a downlink scenario, a superposition coded signal that includes data unique to first and second users is compared with every permutation of the bit positions of the transmitted signal. The values of the received signal that are nearest to the transmitted signal are located to extract the data unique to the first user. In an uplink scenario, a superposition coded signal that includes data unique to the first and second users is compared with every permutation of the bit positions of transmitted signals corresponding to the first and the second users. The values of the received signal that are nearest to the transmitted signal corresponding to the first user are located to extract the data unique to the first user simultaneously with the extraction of the data unique to the second user.

54 Claims, 14 Drawing Sheets

METHODS AND APPARATUS FOR PROVIDING RECEIVERS FOR USE IN SUPERPOSITION CODED MULTI-USER SYSTEMS

CROSS REFERENCE TO A RELATED APPLICATION

This application claims the benefit of U.S. Provisional Application No. 60/975,627, filed Sep. 27, 2007, which is hereby incorporated by reference herein in its entirety.

BACKGROUND OF THE INVENTION

The present invention is directed to methods and apparatus for providing receivers for use in superposition coded multi-user systems, and more particularly to extracting data from a superposition coded signal using an enhanced log-likelihood ratio (LLR) computation circuit.

Wireless communication systems operating with multiple users generally include a base station (or a transmission source) which broadcasts data signals to all users (referred to as downlink) and which receives data signals from each of the users (referred to as uplink). As defined herein, the term user represents any device remote from the transmission source or base station including MP3 players, portable computing devices, personal digital assistants, laptops, mobile phones, wireless devices, or any other device with wireless communication capabilities that can receive or transmit superposition coded signals. Each user must have the capability of differentiating the user's data from the data corresponding to the other users which is present in the same broadcasted signal. Similarly, the base station must have the capability of differentiating each user's data since it receives all of the data as one signal from all of the users. Thus, an orthogonal design is typically used which either separates each user's data into a different time slot (time-division multiple access), a different frequency slot (frequency division multiple access) or a different coding scheme (code division multiple access).

Although such orthogonal systems are relatively simple to implement and provide high data reliability, the data rate achieved is not optimal. Superposition coding systems increase the data rate by simultaneously providing the data signals for all of the users in at least one of the same time slot, frequency slot and coding scheme. However, the receivers in superposition coding systems are more complex than those used in orthogonal systems and thus impractical to implement.

More specifically, the receivers in superposition coding systems typically apply high complexity successive interference cancellation (SIC) algorithms to extract the data corresponding to a particular user. SIC algorithms have a high complexity because a particular user's receiver has to decode every other user's data first and cancel from the received signal the other user's data before the user's receiver extracts the user's own data from the received signal. As defined herein extracting data means computing an information (data) bit stream containing information about the reliability of each received symbol (i.e., soft decoding).

Accordingly, low complexity receivers are critical to obtain high data rates with greater data reliability in superposition coded multi-user systems.

SUMMARY OF THE INVENTION

In accordance with the principles of the present invention, methods and apparatus provide low-complexity receivers for use in superposition coded multi-user systems. In particular, a minimum value evaluation is made for the received superposition coded signal relative to the possibly transmitted signal to compute LLR values for use in subsequently extracting the data corresponding to the receiving user.

In one embodiment, in the downlink scenario, the superposition coded signal is received by a first user and compared against every permutation of the bit positions of the transmitted signal. The nearest values between the two signals are located to determine LLR values unique to the first user. The LLR values are then provided to a deinterleaver and a decoder to extract the data unique to the first user. The receiver extracts data unique to the first user without having to cancel out from a received signal data values unique to a second user and is therefore less complex than conventional receivers.

In particular, a test vector generation circuit produces vectors that represent every permutation of the data signals (including the data corresponding to the first and the second users). The vectors are combined with the channel estimate of the first user to produce test vectors for the first user. The received signal is compared with the test vectors associated with the first user to locate the minimum values between the received signal and the corresponding test vector values. In one implementation, an enhanced LLR computation circuit is used to locate the minimum values and compute the LLR values unique to the first user. The computed LLR values may be provided to a deinterleaver and a decoder to extract data values unique to the first user.

In another embodiment, in the downlink scenario, the data values unique to the second user are extracted first and subsequently canceled from the received signal to form a modified received signal. An enhanced LLR computation circuit analyzes the modified received signal to compute LLR values unique to the first user. In particular, a test vector generation circuit may produce vectors that represent every permutation of the data signals (e.g., $x_1[m]$ and $x_2[m]$) and are combined with the channel estimate associated with the first user to produce the test vectors (e.g., $h_1[m]x_1[m]$ and $h_1[m]x_2[m]$). The test vectors are compared with the received signal to locate the minimum values for determining the LLR data values unique to the second user. The LLR values may be provided to deinterleaver and decoder to extract data unique to the second user. The data values unique to the second user may be modulated and combined with a channel estimate associated with the first user and subtracted (or canceled) from the received signal to produce the modified received signal. An LLR computation circuit may compare the modified received signal with test vectors that correspond only to the first user data (e.g., $h_1[m]x_1[m]$) to find the nearest values in the modified received signal and thereby compute LLR values unique to the first user. The LLR values unique to the first user may be provided to a deinterleaver and a decoder to extract data values unique to the first user.

In one embodiment, in the uplink scenario, the superposition coded signal is received by a transmission source from multiple users and compared against every permutation of the bit positions of the transmitted signals (e.g., $x_1[m]$ and $x_2[m]$). The nearest values between the two signals are located to simultaneously compute LLR values unique to the first and the second users. The computed LLR values may be provided to deinterleavers and decoder to extract data values unique to the first and second users. The receiver may extract data unique to a first and a second user simultaneously without having to cancel out from a received signal data values unique to one of the users and is therefore more efficient and less complex than conventional receivers.

In particular, a first test vector generation circuit produces a first set of vectors that represent every permutation of the data signals corresponding to the first user. A second test vector generation circuit produces a second set of vectors that represent every permutation of the data signals corresponding to the second user. The set of vectors are combined with their respective first and second user channel estimates to produce first and second sets of test vectors. The received signal is compared with the test vectors associated with the first and the second users to locate the minimum values between the received signal and the corresponding test vector values. The LLR values unique to the first or the second user are computed by determining which values of the received signal are nearest to the first or second test vectors. The LLR values may be subsequently provided to deinterleavers and decoders to extract the data values unique to the first and second users.

In another embodiment, in the uplink scenario, the data values unique to the first user are extracted first and subsequently canceled from the received signal to form a modified received signal. An enhanced LLR computation circuit analyzes the modified received signal to extract the data values unique to the second user. In particular, the first and second test vector generation circuits may produce the two sets of test vectors. The test vectors are compared with the received signal to locate the minimum values for computing LLR values unique to the first user. The LLR values unique to the first user may be provided to a deinterleaver and a decoder to extract data values unique to the first user. The data values unique to the first user may be modulated and combined with a channel estimate associated with the first user and subtracted (or canceled) from the received signal to produce the modified received signal. An LLR computation circuit may compare the modified received signal with test vectors that correspond only to the second user data (e.g., $h_2[m] x_2[m]$) to find the nearest values in the modified received signal and thereby compute LLR values unique to the second user. The LLR values unique to the second user may be provided to a deinterleaver and a decoder to extract data values unique to the second user.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This invention generally relates to extracting data from a superposition coded signal that is received by a transmission source or a user receiver. For illustrative purposes, this invention will be described in the realm of a superposition coded signal that includes data unique to two different users but it should be understood that this invention is applicable to superposition coded signals that include data unique to more than two users.

Figure 1A:
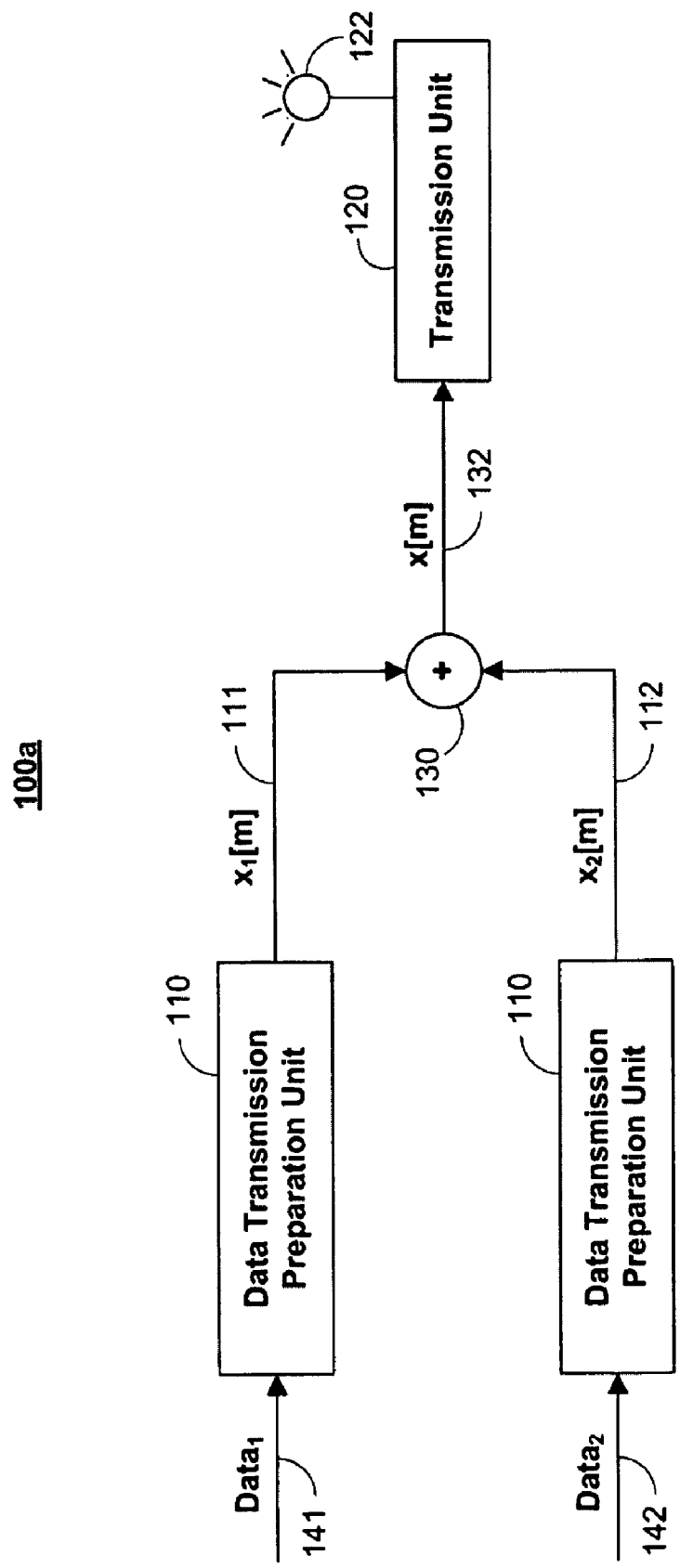
FIG. 1a is a diagram of an illustrative transmission source superposition coded signal downlink transmitter in accordance with an embodiment of the present invention.

FIG. 1a is a diagram of an illustrative transmission source superposition coded signal downlink transmitter 100a in accordance with an embodiment of the present invention. As defined herein, the term transmission source is used to represent any base station source, WiMax transmission source, WiFi transmission source, mobile phone tower, or any other source that broadcasts or receives a superposition coded signal to/from users. Transmitter 100a when operating in downlink mode combines and transmits data unique to two different users as one signal. The data unique to the two users is transmitted in the signal in at least one of the same time slot, frequency slot and coding scheme. This signal is referred to as a superposition coded signal.

Transmitter 100a may include a data transmission preparation unit 110, an adder or combiner circuit 130 and a transmission unit 120. The data signals 141 and 142 received by transmitter 100a correspond to data bits that are unique to a first and a second user, respectively.

Each data transmission preparation unit 110 is coupled to receive one of data signals 141 or 142. Data transmission preparation unit 110 is described in more detail below in connection with FIG. 1b. Data transmission preparation units 110 may prepare the received data signals 141 and 142 for transmission by encoding, interleaving and modulating data signals 141 and 142. In particular, the outputs 111 and 112 of each respective data transmission preparation unit 110 is $x_1[m]$ or $x_2[m]$ which are the transmitted symbols representing the received data. In some implementations, $x_1[m]$ and $x_2[m]$ are Quadrature Phase-Shift Keying (QPSK) signals (e.g., 2PSK, Binary Phase Shift Keying (BPSK), 4PSK, or QPSK equivalent to 4QAM) where each symbol may be represented by two constellation bits for a total of four possible permutations while in some other implementations $x_1[m]$ and $x_2[m]$ are Quadrature Amplitude Modulation (QAM) signals (e.g., 4QAM, 16QAM, 32QAM or 64QAM) scaled according to the power distribution among the first and second users. It should be understood that any other suitable modulation/coding scheme may be used in accordance with this invention. For example, Pulse Amplitude Modulation (PAM) schemes, convolutional codes, block codes, turbo codes, and low-density parity-check (LDPC) codes may be used in accordance with this invention.

Outputs 111 and 112 of each data transmission preparation unit 110 are combined using an adder circuit 130 to form a single frequency domain signal 132 or x[m] that includes data corresponding to the first and second users (i.e., data signals 141 and 142). Frequency domain signal 132 or x[m] is the superposition coded signal that is broadcast to all users (e.g., the first and second users). Transmission unit 120 receives the superposition coded signal or single frequency domain signal 132 and broadcasts the signal to multiple users over one or more sub-carriers through an antenna 122. The modulation scheme or transmission scheme used to broadcast the signal may be predefined by the WiFi, WiMax, mobile phone, or other suitable standard.

Transmission unit 120 may perform an algorithm to convert the digital data to analog signals for broadcast. Transmission unit 120 may perform this conversion using any suitable digital to analog converter. Transmission unit 120 may also perform a Fast Fourier Transform (FFT) algorithm on the analog data to convert the time-domain data to the frequency domain and thereby prepare it for transmission.

The output of transmitter 100a which is received by two different users can be represented by the following system model:

$$y_1[m]=h_1[m](x_1[m]+x_2[m])+z_1[m]$$

$$y_2[m]=h_2[m](x_1[m]+x_2[m])+z_2[m]$$

where $y_1[m]$ and $y_2[m]$ represent the signals received by the first and second users respectively, $h_1[m]$ and $h_2[m]$ represent the channel gains from the transmission source to each respective user, $x_1[m]$ and $x_2[m]$ represent the transmitted data signals for each respective user and $z_1[m]$ and $z_2[m]$ represent the complex Gaussian noise with a mean zero and variance $\sigma_{z_1}^2$ and $\theta_{z_2}^2$ for the transmission source. The m represents the time index or frequency index of the transmitted signals.

Figure 1B:
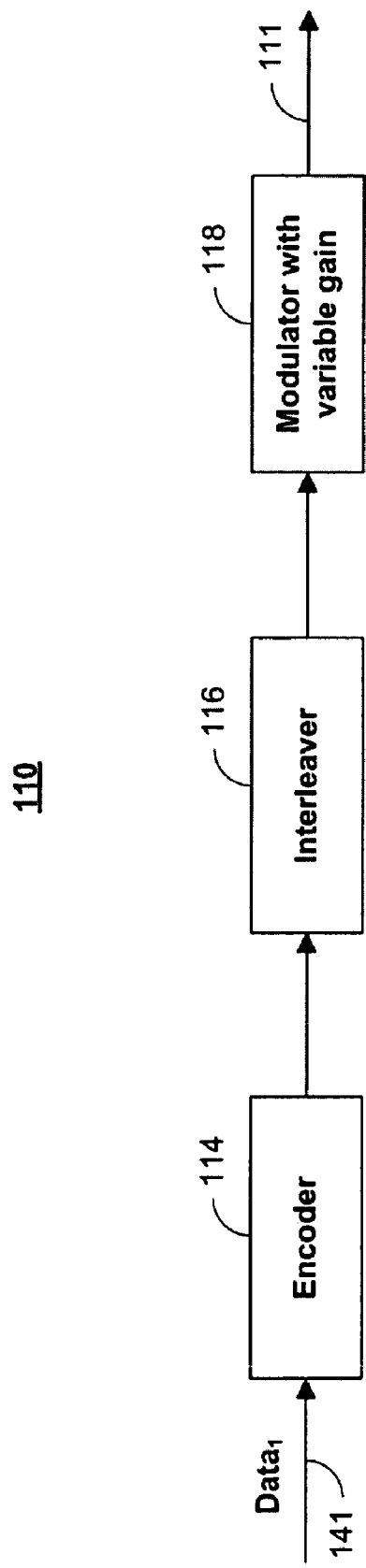
FIG. 1b is a diagram of an illustrative data transmission preparation unit in accordance with an embodiment of the present invention.

FIG. 1b is a diagram of illustrative data transmission preparation unit 110 in accordance with an embodiment of the present invention. Data transmission preparation unit 110 may include an encoder 114, an interleaver 116 and a modulator 118. Encoder 114 receives data 141 or 142 and encodes the data in accordance with a suitable encoding scheme to increase the reliability during the decoding phase. In particular, extra data bits may be added to the data to enable a receiving device to detect and/or correct errors that may occur in transmission.

Interleaver 116 may receive the encoded data from encoder 114 and arrange the data in a non-contiguous way in order to increase performance. Interleaver 116 is an optional component in that the encoded data may be provided directly (not shown) to modulator 118.

Modulator 118 receives the encoded data either from encoder 114 or interleaver 116 and performs a bit-to-symbol mapping with appropriate scaling on the encoded data. For example, modulator 118 may be a QPSK modulator which may map two encoded bits 00, 01, 11 and 10 to (K,K), (−K,K), (−K,−K) and (K,−K), respectively, where K is a constant representing the average power of a transmitted symbol. Modulator 118 may also include scaling circuitry (not shown) for operating with QAM signals.

In one embodiment, in the downlink scenario, the transmitted superposition coded signal is received by one or more users. In one implementation (which is discussed first below), each user extracts the data corresponding only to itself (i.e., the receiving user) by applying an enhanced LLR computation algorithm to the received signal y to produce the bit-metrics (LLR values) from the received symbols, performing an optional deinterleaving operation on the LLR values and decoding the data using a data extraction unit. The enhanced LLR computation algorithm compares the received signal y with every permutation of the transmitted signal x to find the minimum distance between the two signals. The values of the received signal y that are nearest to the transmitted signal x represent the estimate of the data associated with the particular user (i.e., the LLR bit-metric associated with the particular user). In this sense, the enhanced LLR computation algorithm can be considered as a demodulator. The output of the enhanced LLR computation algorithm may be input to the deinterleaver which may reorder the bit-metrics (LLR values) according to the reverse ordering of the interleaver. A decoder may then be used to recover the information data bit stream associated with the particular user. As referred to below, the first user is the user which receives the signal y[m] (i.e., the receiving user) and extracts the data unique itself while the second user is the user which has data in the signal y[m] that interferes with the first user's data.

In another implementation (which is discussed following the first implementation below), the first user applies an enhanced LLR computation algorithm to the received signal y using a data extraction unit to extract data that is associated with the second user and subsequently cancels out from the received signal y the values associated with the second user to produce a modified received signal y'. The first user may apply an LLR computation algorithm to the modified received signal y' to compute LLR values unique to the first user and to subsequently extract the data that corresponds to the first user.

Figure 2:
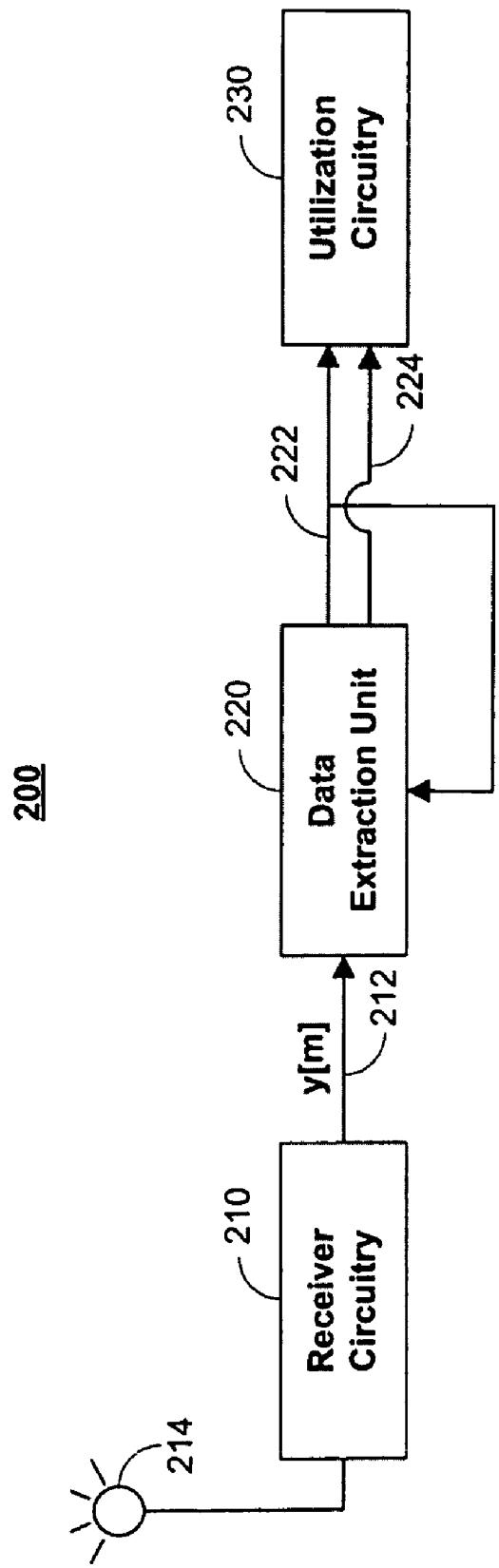
FIG. 2 is a detailed illustration of a superposition coded signal receiver in accordance with an embodiment of the present invention.

FIG. 2 is a detailed illustration of a superposition coded signal receiver 200 in accordance with an embodiment of the present invention. Superposition coded signal receiver 200 includes receiver circuitry 210, a data extraction unit 220 and utilization circuitry 230. Receiver 200 may be implemented by each user for extracting data from a signal transmitted by a transmission source (i.e., downlink operation). Receiver 200 may also be implemented by a transmission source for extracting data unique to one user from a signal transmitted by multiple users (i.e., uplink operation). Receiver 200 will first be described below in the context of the downlink operation and will subsequently be described in the context of the uplink operation.

Receiver circuitry 210 includes an antenna 214 which receives the superposition coded signal transmitted by a transmission source. In some embodiments, receiver circuitry 210 may include a digital signal processor and/or analog-to-digital converter for processing the received signal. In some implementations, receiver 210 performs an Inverse Fast Fourier Transform (IFFT) on the received data. Receiver 210 may perform various filtering and noise reducing operations on the received signal. Receiver 210 may also perform synchronization operations on the received signal which may include symbol timing synchronization, sampling frequency synchronization, and carrier frequency synchronization. Receiver 210 may also demodulate the received signal and output a noise reduced demodulated received signal 212 y[m] to data extraction unit 220 which extracts the data from the superposition coded signal that is unique to the first user. As discussed above and below, the data extracted by data extraction unit 220 is an information (data) bit stream containing information about the reliability of each received symbol (i.e., soft decoding).

Data extraction unit 220 is coupled to receive the signal 212 y[m]. Data extraction unit 220, in one implementation, compares the values of every bit position of the received signal 212 y[m] with every permutation of the bit positions of the transmitted signal x[m] to find the minimum distance between the two signals. The values having the minimum value (i.e., the values nearest to each other) are the values of the received signal 212 y[m] that have the highest probability of being the unique values corresponding to the first user. This implementation is described in more detail below in connection with FIG. 3. Data extraction unit 220 outputs the extracted data 222 to utilization circuitry 230 for use by the first user.

Utilization circuitry 230 may implement various analog or digital operations. For example, utilization circuitry 230 may receive extracted data 222 and process the data by applying the data to video/audio/control operations. Extracted data 222 may be the information bits at the physical layer level which may be fed to a MAC layer in communication systems. Utilization circuitry 230 may include MAC layer circuitry for providing MAC layer information bits from extracted data 222. The MAC layer information bits may contain any data video, audio, or control information. Utilization circuitry 230 may also transfer or transmit the processed data to another user or device via a BLUETOOTH, INFRARED, cable, or any other wired or wireless communications link.

In some implementations, data extraction unit 220 first extracts data unique to the second user and subsequently extracts data unique to the first user. In particular, data extraction unit 220 may perform enhanced LLR computation on the received signal 212 to subsequently extract the data 222 unique to the second user by performing optional deinterleaving and decoding operations. The extracted data 222 unique to the second user is fed back into data extraction unit 220 for canceling the data from the received signal. In particular, data extraction unit 220 may cancel from the received signal 212 the extracted data 222 unique to the second user to subsequently extract the data 224 unique to the first user. Data extraction unit 220 may provide both sets of data to utilization circuitry 230 for use in various applications. Alternatively, data extraction unit may simultaneously extract data 222 and 224 unique to each of the users that transmit the superposition coded signal (e.g., in an uplink scenario). These implementations are described in more detail below in connection with FIGS. 4 and 6.

Figure 3:
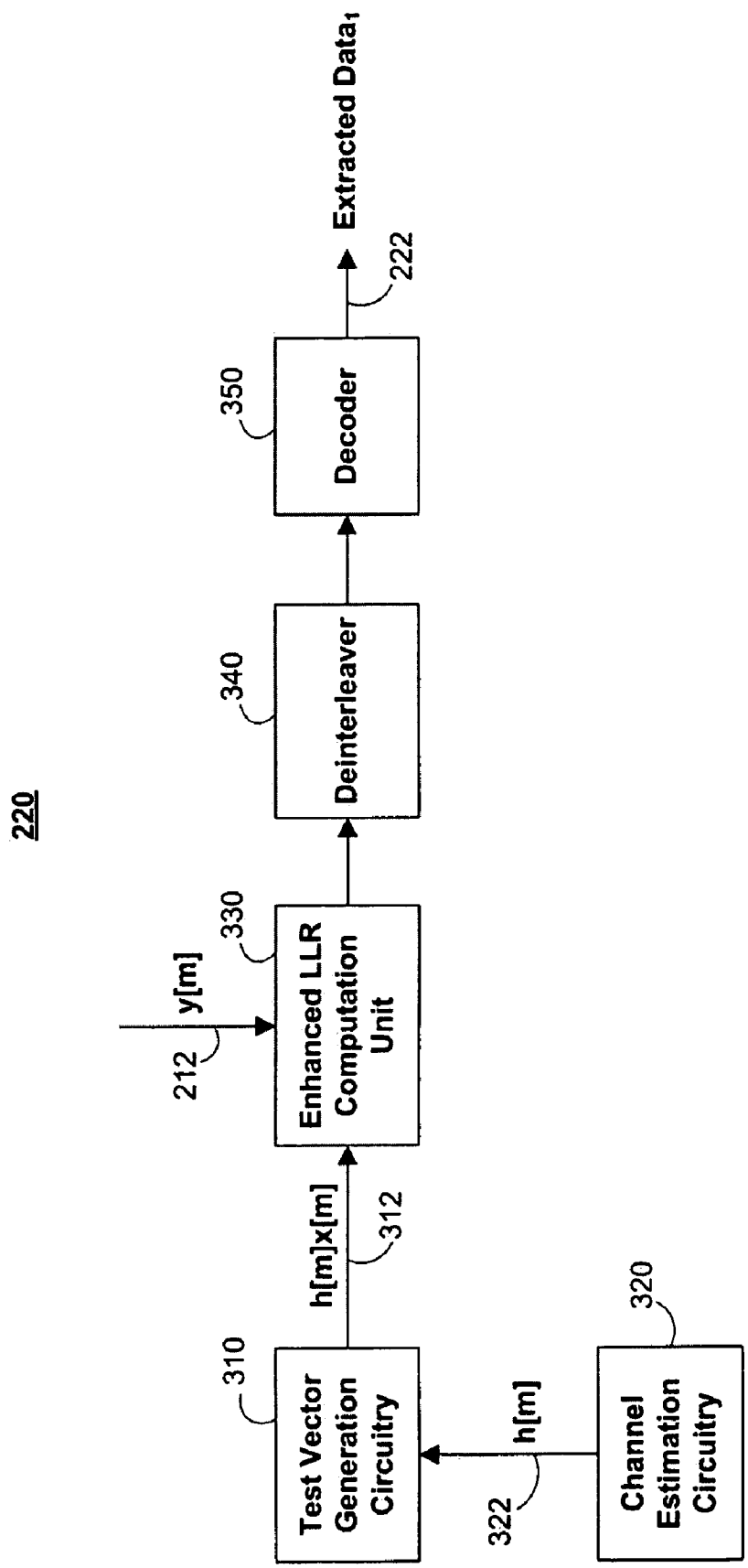
FIG. 3 is an illustrative diagram of a superposition coded signal data extraction unit in accordance with an embodiment of the present invention.

FIG. 3 is an illustrative diagram of a superposition coded signal data extraction unit 220 in accordance with an embodiment of the present invention. Data extraction unit 220 includes test vector generation circuitry 310, channel estimation circuitry 320, enhanced LLR computation unit 330, a deinterleaver 340 and a decoder 350. As discussed above, in one implementation, data extraction unit 220 receives the superposition coded signal 212 and compares it with every permutation of the transmitted signal to subsequently extract the data unique to the first user by performing optional deinterleaving and decoding operations.

Test vector generation circuitry 310 provides every possible permutation of the transmitted signal x[m]. For example, when the transmitted signal x[m] is a QPSK signal with data values unique to two users, test vector generation circuitry 310 provides the values in the set {(1010, 1000, 0010, 0000), (1011, 1001, 0011, 0001), (1110, 1100, 0110, 0100), and (1111, 1101, 0111, 0101)} for signal x[m], where the first two bits of the labels represent the transmitted data signal $x_1[m]$ unique to the first user and the second two bits of the labels represent the transmitted data signal $x_2[m]$ unique to the second user. In some implementations, all the bit permutations of the transmitted signal x[m] are stored in a memory (not shown) making it unnecessary to compute all the bit permutations each time a signal is received.

Test vector generation circuitry 310 receives a channel estimate 322 h[m] that corresponds to the channel through which the first user receives the signal 212. Channel estimation circuitry 320 may continuously compute the channel estimate 322 and provide the estimate to test vector generation circuitry 310. Alternatively, the channel estimate 322 may be predefined and stored in a memory of channel estimation circuitry 320. In such a scenario, channel estimation circuitry 320 retrieves the stored channel estimate and provides the retrieved channel estimate 322 to test vector generation circuitry 310. Any suitable method of computing the channel estimate may be implemented by channel estimation circuitry 320. It should be understood that each user has a channel estimate 322 associated with the user that is unique to the particular user. For example, a first user may be at a different location than a second user and accordingly, the first user may compute a first channel estimate $h_1[m]$ that corresponds to the first user and the second user may compute a different second channel estimate $h_2[m]$ that corresponds to the second user.

Test vector generation circuitry 310 applies the received channel estimate 322 to the transmitted signal x[m]. In particular, test vector generation circuitry 310 may multiply every possible permutation of the transmitted signal x[m] by the channel estimate 322 that it receives from channel estimation circuitry 320. Accordingly, for a first user with a channel estimate defined by $h_1[m]$, test vector generation circuitry 310 outputs the test vector 312 $h_1[m]x[m]$ where x[m] represents every possible permutation of each bit position of the transmitted superposition coded signal.

Test vector 312 are provided to enhanced LLR computation unit 330 which computes the LLR associated with the first user from the received signal 212. In particular, enhanced LLR computation unit 330 may compare the values at every bit position of the received signal 212 y[m] with the values at the corresponding bit position of test vector 312 to find the minimum distance. The values of the received signal 212 y[m] that are nearest to the test vector 312 $h_1[m]x[m]$ are most likely to be the LLR values unique to the first user. The LLR values may be provided to deinterleaver 340 which may reorder the bit-metrics according to the reverse ordering of interleaver 116 (FIG. 1B). The output of deinterleaver 340 may be provided to decoder 350 which may recover the information data bit stream unique to the first user and output extracted data 222 unique to the first user.

In some implementations, data extraction unit 220 extracts the data 222 unique to the first user by first performing an enhanced log-likelihood ratio (LLR) computation. For example, data extraction unit 220 may extract the data in accordance with the following equation:

$$LLR_k(m, l) = \log\left(\sum_{x \in X_l^{(1)}[m]} \exp\left(-\frac{|y_k[m] - h_k[m]x|^2}{\sigma_{z_k}^2}\right)\right) - \log\left(\sum_{x \in X_l^{(0)}[m]} \exp\left(-\frac{|y_k[m] - h_k[m]x|^2}{\sigma_{z_k}^2}\right)\right)$$

where k identifies the user (e.g., the first user or the second user), m is a time or frequency index, l is a bit position, $\sigma_{z_k}^2$ is a noise estimate, $h_k[m]x$ corresponds to the test vector 312 generated by test vector generation circuitry 310, $X_l^{(b)}[m]$ is a set of signal constellation points x[m] whose l-th bit position has a value of b and y[m] is the received signal 212. Alternatively, data extraction unit 220 may extract the data by computing an approximation of the LLR in accordance with the following equation:

$$LLR_k(m, l) = \frac{1}{\sigma_{z_k}^2}\left[\min_{x \in X_l^{(0)}[m]}\{|y_k[m] - h_k[m]x|^2\} - \min_{x \in X_l^{(1)}[m]}\{|y_k[m] - h_k[m]x|^2\}\right]$$

where k identifies the user (e.g., the first user or the second user), m is a time or frequency index, l is a bit position, $\sigma_{z_k}^2$ is a noise estimate, $h_k[m]x$ corresponds to the test vector 312 generated by test vector generation circuitry 310, $X_l^{(b)}[m]$ is a set of signal constellation points x[m] whose l-th bit position has a value of b and y[m] is the received signal 212.

Figure 4:
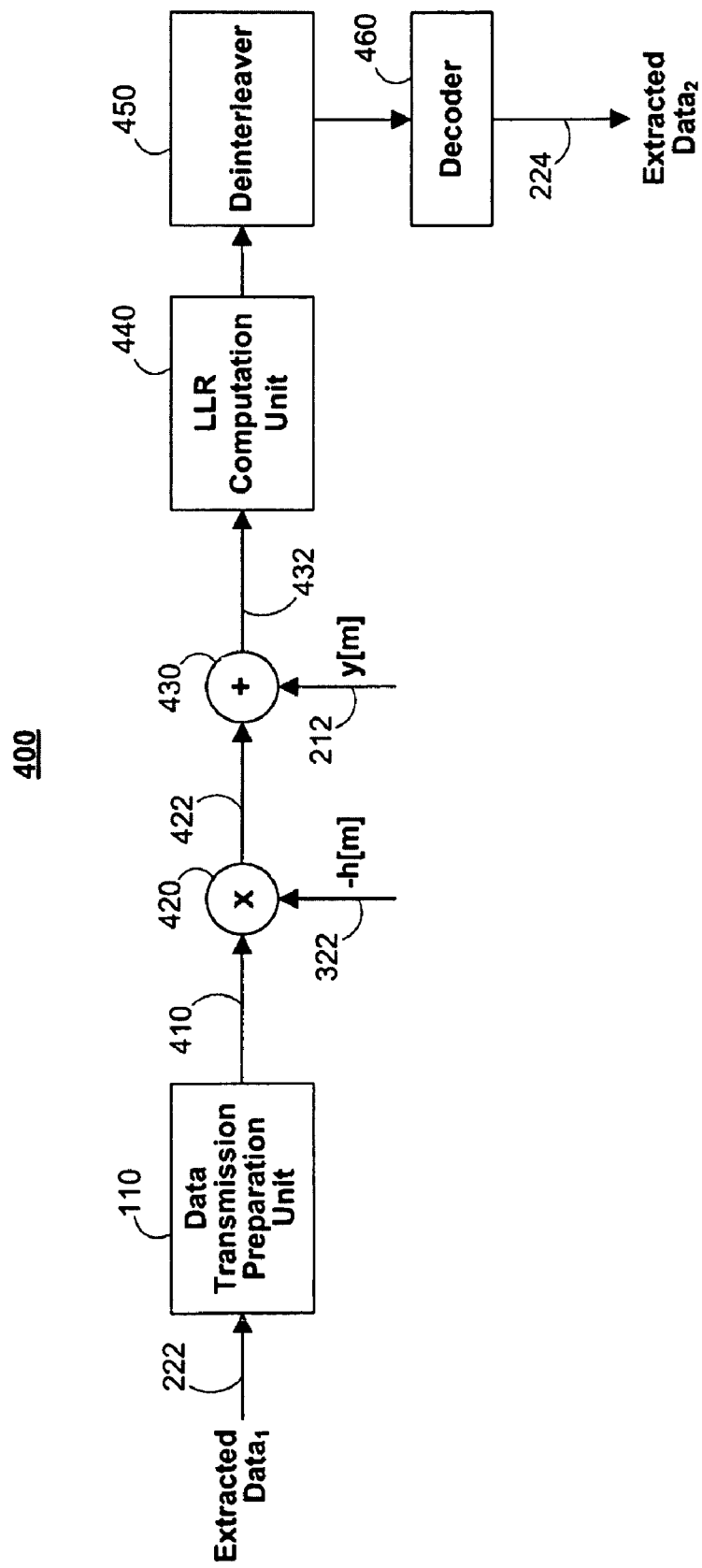
FIG. 4 is a detailed illustration of a superposition coded signal data extraction unit in accordance with another embodiment of the present invention.

In some implementations, data extraction unit 220 may extract the data unique to the second user before extracting the data unique to the first user. This may be done in order to cancel the data unique to the second user from the received signal for extracting the data unique to the first user. FIG. 4 shows data extraction unit 400 that extracts data unique to a first user by canceling the data unique to the second user from the received signal. Data extraction unit 400 includes every component that is included in data extraction unit 220 (FIG. 2) (not shown) with the addition of data transmission preparation unit 110, a multiplier 420, an adder 430, an LLR computation unit 440, a deinterleaver 450 and a decoder 460. Data extraction unit 400 is an alternate implementation of data extraction unit 220.

It should be understood that the first user may extract data from a received signal by using data extraction unit 220 (FIG. 2) while the second user may extract data from a received signal using data extraction unit 400. Alternatively, the first user may extract data from a received signal by treating the data unique to the second user as noise and performing an LLR computation while the second user extracts the data using data extraction unit 220 or 400.

Data extraction unit 400 receives the extracted data 222 unique to the second user and uses data transmission preparation unit 110 to encode, interleave (if necessary), and modulate the extracted data 222. By passing the extracted data 222 through transmission preparation unit 110, data extraction unit 400 converts the extracted data into a transmission signal 410 that only includes data unique to the second user.

Data extraction unit 400 may subsequently apply the channel estimate associated with the first user (e.g., $h_1[m]$) to recreate the received signal y[m] as it would be had only the second user's data been present in the received signal y[m]. Multiplier circuitry 420 may be used to apply the channel estimate to the signal 410. The channel estimate applied to the signal 410 is in the negative form in order to subsequently cancel the second user's data from the received signal y[m]. The output 422 of multiplier 420 is provided to adder circuitry 430 which combines (e.g., adds together) the recreated signal 422 with the received signal y[m]. Alternatively, the channel estimate applied to signal 410 may be in the positive form and adder circuitry 430 may behave as a substractor to subsequently cancel the second user's data from the received signal y[m].

The output of adder circuitry 430 is a modified received signal 432 y'[m]. Modified received signal 432 y'[m] includes only the data unique to the first user since the second user's data is canceled out by adder circuitry 430. LLR computation unit 440 receives modified received signal 432 y'[m] and uses an LLR computation scheme to compute LLR values unique to the first user. The LLR values may be provided to deinterleaver 450 which may reorder the bit-metrics according to the reverse ordering of the interleaver. The output of deinterleaver 450 may be provided to decoder 460 which may recover the information data bit stream unique to the first user and output extracted data 224 unique to the first user.

For example, LLR computation unit 440 may compare modified received signal 432 y'[m] with every permutation of the bit positions of the transmitted signal corresponding to the first user (i.e., $x_1[m]$). In particular, whereas the enhanced LLR computation unit compared the received signal with every permutation of the transmitted signal x[m] (corresponding to the first and second users' data values), LLR computation unit 440 compares the modified received signal y'[m] with every permutation of the transmitted signal $x_1[m]$ that corresponds to the first user to find the values of modified received signal 432 y'[m] that are nearest to the values of the transmitted signal $x_1[m]$. The values that are nearest to the transmitted signal values are the values in the received signal y[m] that have the highest probability of being the data unique to the first user. Accordingly, LLR computation unit 440 outputs the data with the highest probability as the LLR values unique to the first user for subsequent use by utilization circuitry 230 (FIG. 2).

In particular, data extraction unit may extract the data unique to the first user by computing LLR values in accordance with the following equation:

$$LLR_2(m, l) = \log\left(\sum_{x_2 \in X_{2,l}^{(0)}[m]} \exp\left(-\frac{|y_2[m] - h_2[m](\hat{x}_1[m] + x_2)|^2}{\sigma_{z_2}^2}\right)\right) - \log\left(\sum_{x_2 \in X_{2,l}^{(0)}[m]} \exp\left(-\frac{|y_2[m] - h_2[m](\hat{x}_1[m] + x_2)|^2}{\sigma_{z_2}^2}\right)\right)$$

where m is a time or frequency index, l is a bit position, $y_2[m]$ is the signal received by the first user, $h_2[m]$ is the channel estimate associated with the first user, $\hat{x}_1[m]$ is the extracted data unique to the second user, $x_2[m]$ represents every permutation of the transmitted signal that corresponds to the first user, $X_{2,l}^{(b)}[m]$ is a set of signal contellation points $x_2[m]$ whose l-th bit position has a value of b and $\sigma_{z_2}^2$ is a noise estimate. Alternatively, data extraction unit may extract the data unique to the first user by computing an approximation of the LLR values in accordance with the following equation:

$$LLR_2(m, l) = \frac{1}{\sigma_{z_2}^2} \min_{x_2 \in X_{2,l}^{(0)}[m]} \{|y_2[m] - h_2[m](\hat{x}_1[m] + x_2)|^2\} - \frac{1}{\sigma_{z_2}^2} \min_{x_2 \in X_{2,l}^{(1)}[m]} \{|y_2[m] - h_2[m](\hat{x}_1[m] + x_2)|^2\}$$

where m is a time or frequency index, l is a bit position, $y_2[m]$ is the signal received by the first user, $h_2[m]$ is the channel estimate associated with the first user, $\hat{x}_c[m]$ is the extracted data unique to the second user, $x_2[m]$ represents every permutation of the transmitted signal that corresponds to the first user, $X_{2,l}^{(b)}[m]$ is a set of signal constellation points $x_2[m]$ whose l-th bit position has a value of b and $\sigma_{z_2}^2$ is a noise estimate.

Figure 5:
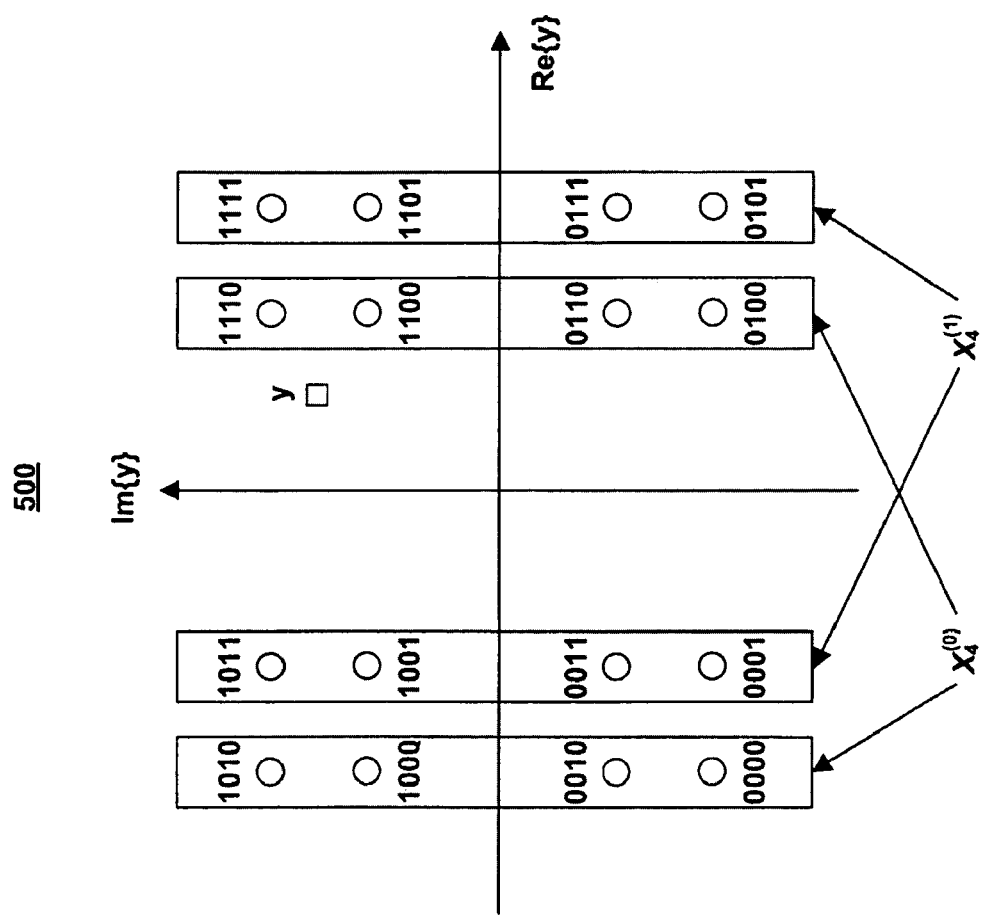
FIG. 5 is a detailed illustration of a Quadrature Phase-Shift Keying (QPSK) superposition signal constellation in accordance with an embodiment of the present invention.

FIG. 5 is a detailed illustration of a Quadrature Phase-Shift Keying (QPSK) superposition signal constellation 500 in accordance with an embodiment of the present invention. Superposition signal constellation 500 shows the distance estimates between the received signal y and every permutation of the bit positions of the transmitted signal x. In particular, as shown in FIG. 5, the values of received signal y that are nearest the transmitted signal x are 1100. Accordingly, data extraction unit 220 or 400 may determine that, for a particular bit position, the received signal y corresponds to the values 1100 or 1110. Data extraction unit 220 or 400 may perform further distance measurements to determine whether the received signal y is closer to the value 1100 or 1110 to determine the greatest likelihood of the value of the bit position of the received signal.

In the uplink scenario, the first user transmits a signal that includes data unique to the first user and the second user transmits a signal that includes data unique to the second user. Each user may transmit the signal to the transmission source using data transmission preparation unit 110 (FIG. 1b). A transmission source may implement a receiver circuitry similar to the receiver 200 shown and described in connection with FIG. 2. The main difference between the receiver 200 when used by the first or second user and when used by the transmission source is with respect to data extraction unit 220.

The system model for the uplink scenario can be represented as follows:

$$y[m] = h_1[m]x_1[m] + h_2[m]x_2[m] + z[m]$$

where m is the time or frequency index, y is the signal received at the transmission source, $h_1[m]$ is the channel gain associated with the first user, $h_2[m]$ is the channel gain associated with the second user, $x_1[m]$ is the data transmitted by the first user, $x_2[m]$ is the data transmitted by the second user, and $z[m]$ represents complex Gaussian noise.

Figure 6:
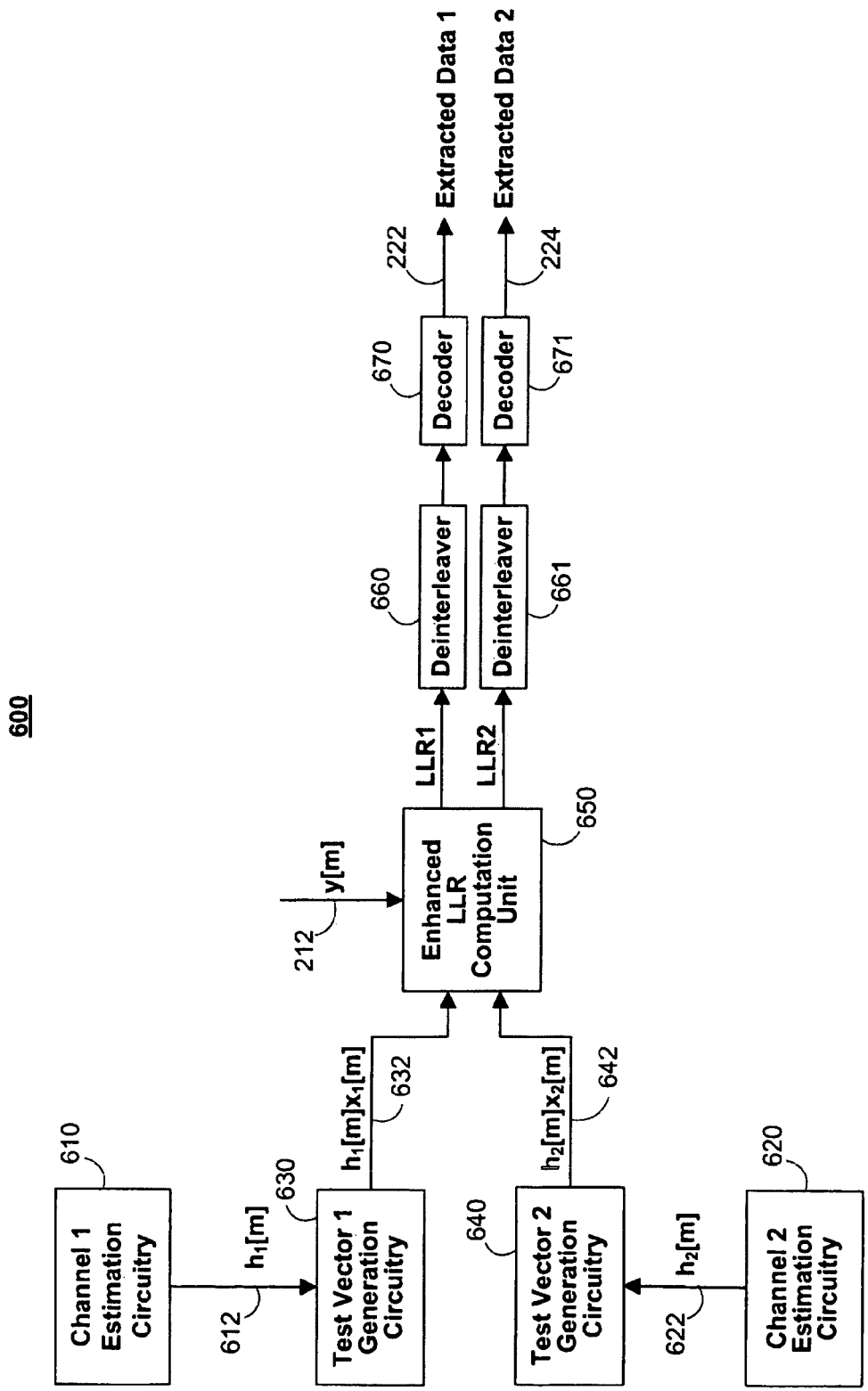
FIG. 6 is a detailed illustration of a superposition coded signal transmission source receiver in accordance with an embodiment of the present invention.

In one implementation, the transmission source may extract the data unique to the first and second users simultaneously from the received signal using a data extraction unit. FIG. 6 is a detailed illustration of a superposition coded signal transmission source receiver 600 in accordance with an embodiment of the present invention. Transmission source receiver 600 is an implementation of data extraction unit 220 when used to simultaneously extract the data unique to the first and second users simultaneously from the received signal. Transmission source receiver 600 includes first channel estimation circuitry 610, second channel estimation circuitry 620, first test vector generation circuitry 630, second test vector generation circuitry 640, enhanced LLR computation unit 650, deinterleavers 660 and 661 and decoders 670 and 671.

First and second test vector generation circuitries 630 and 640 operate in a similar manner as test vector generation circuitry 310 (FIG. 3). In particular, each test vector generation circuitry 630 and 640 generates a vector that represents every permutation of the bit positions of the transmitted signal corresponding to either the first or the second user. First and second test vector generation circuitries 630 and 640 receive channel estimates 612 and 622 corresponding to the first and second channels. In particular, each channel estimation circuitry 610 and 620 may continuously compute (or alternatively retrieved a predefined) channel estimate that is associated with the particular user. For example, the channel estimation circuitry 620 may compute the channel estimate associated with the first user while the channel estimation circuitry 630 may compute the channel estimate associated with the second user.

Each test vector generation circuitry 630 and 640 combines the received channel estimate with the permutations of the transmitted signal to output the transmitted signal multiplied by the channel estimate for comparison to the received signal. In particular, each test vector generation circuitry 630 and 640, outputs either test vector 632 $h_1[m]x_1[m]$ or test vector 642 $h_2[m]x_2[m]$.

Enhanced LLR computation unit 650 receives the test vectors 632 and 642 and compares their values with the received signal y[m] values to find the minimum distances between the values. The values of y[m] that are nearest to test vector 632 values may correspond to the LLR values unique to the first user while the values of y[m] that are nearest to test vector 642 values may correspond to the LLR values unique to the second user. The LLR values unique to each of the first and second users may be provided to a respective deinterleaver 660 and 661 which may reorder the bit-metrics according to the reverse ordering of the interlayer. The outputs of deinterleavers 660 and 661 may be provided to respective decoders 670 and 671 which may recover the information data bit stream unique to the first user and second users and output extracted data 222 unique to the first user and extracted data 224 unique to the second user.

For example, transmission source receiver 600 may extract data unique to the first and second users by computing LLR values in accordance with the following equation:

$$LLR_k(m, l) = \log\left(\sum_{x_k \in X_l^{(1)}[m], x_{\bar{k}} \in X_{\bar{k}}[m]} \exp\left(-\frac{|y[m] - h_1[m]x_1 - h_2[m]x_2|^2}{\sigma_z^2}\right)\right) - \log\left(\sum_{x_k \in X_l^{(0)}[m], x_{\bar{k}} \in X_{\bar{k}}[m]} \exp\left(\frac{|y[m] - h_1[m]x_1 - h_2[m]x_2|^2}{\sigma_z^2}\right)\right)$$

where LLR is the minimum distance values of y, k identifies the mobile station, m is a time or frequency index, l is a bit position, $\sigma_z^2$ is a noise estimate, $h_1[m] \, x_1$ corresponds to test vectors 632, $h_2[m]x_2$ corresponds to test vectors 642, $X_l^{(b)}[m]$ is a set of signal constellation points x[m] whose l-th bit position has a value of b, $\bar{k}$ is equal to 1 when k=2 and is equal to 2 when k=1 and y is the received signal. Alternatively, transmission source receiver 600 may extract data unique to the first and second users by computing an approximation of the LLR values in accordance with the following equation:

$$LLR_k(m, l) = \frac{1}{\sigma_z^2} \min_{x_k \in X_l^{(0)}[m], x_{\bar{k}} \in X_{\bar{k}}[m]} \{|y[m] - h_1[m]x_1 - h_2[m]x_2|^2\} - \frac{1}{\sigma_z^2} \min_{x_k \in X_l^{(1)}[m], x_{\bar{k}} \in X_{\bar{k}}[m]} \{|y[m] - h_1[m]x_1 - h_2[m]x_2|^2\}$$

where LLR is the minimum distance values of y, k identifies the mobile station, m is a time or frequency index, l is a bit position, $\sigma_z^2$ is a noise estimate, $h_1[m] \, x_1$ corresponds to test vectors 632, $h_2[m]x_2$ corresponds to test vectors 642, $X_l^{(b)}[m]$ is a set of signal constellation points x[m] whose l-th bit position has a value of b, $\bar{k}$ is equal to 1 when k=2 and is equal to 2 when k=1 and y is the received signal.

In an alternate embodiment, data extraction unit 220 may extract the data unique to each user simultaneously by extracting the data unique to the first user using receiver circuitry 600 and extracting the data unique to the second user by treating the data unique to the first user as noise in the received signal and extracting the data unique to the second user from the received signal.

In another implementation, instead of extracting the data unique to each user simultaneously, the transmission receiver may first extract the data 222 unique to the first user using receiver circuitry 600 and subsequently canceling the data unique to the first user from the received signal to extract the data 224 unique to the second user. This implementation is similar to the implementation discussed above in connection with FIG. 4. In particular, the extracted data unique to the first user is passed through data preparation unit 110 (FIG. 1b) and multiplied by the channel response associated with the first user to produce a signal that includes only data associated with the first user. The signal that includes only the data associated with the first user is then subtracted (or canceled) from the received signal y which is then provided to an LLR computation unit (not shown) to compute LLR values unique to the second user and subsequently extract the data 224 unique to the second user.

Figure 7:
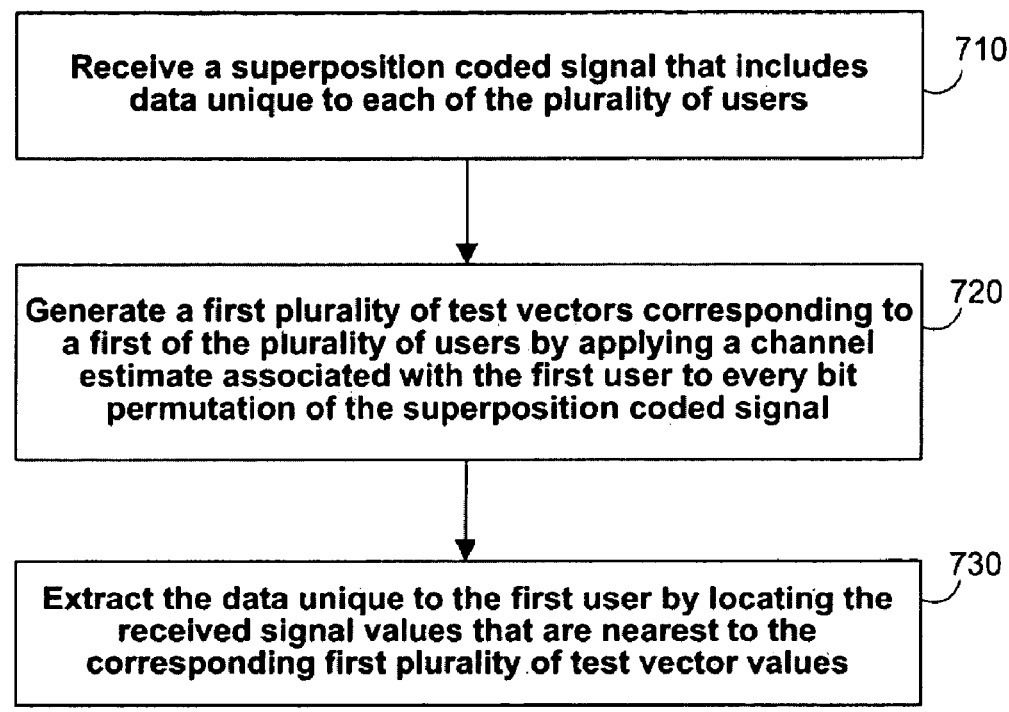
FIG. 7 illustrates a process performed by a superposition coded signal receiver at a user during downlink in accordance with an embodiment of the present invention.

FIG. 7 illustrates a process 700 performed by a superposition coded signal receiver at a user during downlink in accordance with an embodiment of the present invention. At step 710, a superposition coded signal is received that includes data unique to each of a plurality of users. For example, receiver 200 receives signal y[m] which includes data signals $x_1[m]$ and $x_2[m]$ which are unique to the first and second users and are combined and transmitted by a transmission source (FIG. 2).

At step 720, a first set of test vectors that correspond to a first of the users are generated by applying a channel estimate associated with the first user to every bit permutation of the superposition coded signal. For example, data extraction unit 220 may include test vector generation circuitry 310 which produces either on the fly or retrieves from memory every permutation of the bit positions of the transmitted signal x[m] (FIG. 3). The bit permutations correspond to every permutation of the first and second data signals that are transmitted. The permutations are multiplied by the channel estimate that is provided by channel estimation circuitry 320 to produce the test vectors for subsequent comparison to the received signal y[m].

At step 730, the data unique to the first user is extracted by locating the received signal values that are nearest to the corresponding first set of test vector values. For example, enhanced LLR computation unit 330 may receive the test vectors (e.g., h[m]x[m]) and compare their values with the received signal values y[m] (FIG. 3). The enhanced LLR computation unit 330 may compute LLR values unique to the first user by locating, from the comparison, the values in the received signal that are nearest to the test vector values as those values have the highest probability of being the data unique to the first user. The LLR values may be provided to an optional deinterleaver and decoder to extract the data unique to the first user.

Figure 8:
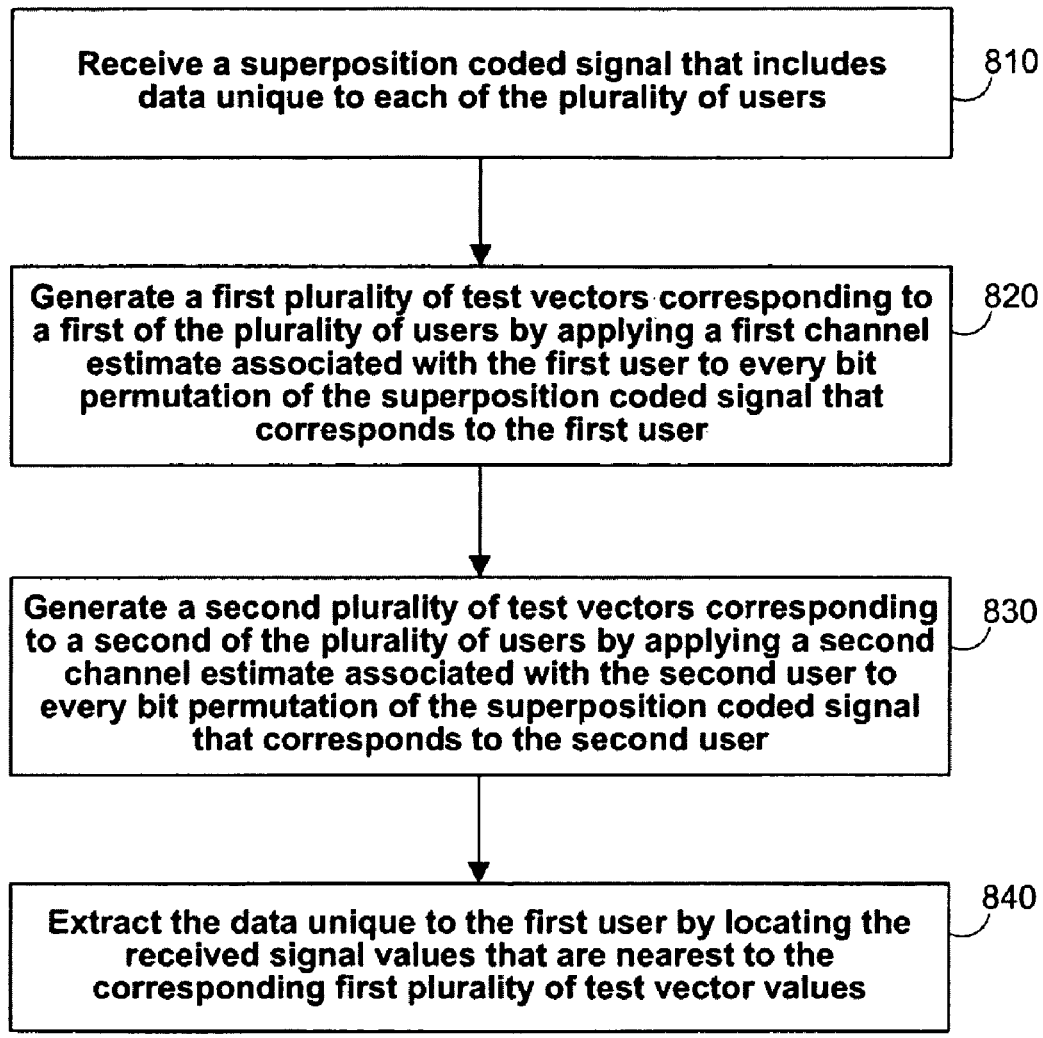
FIG. 8 illustrates a process performed by a superposition coded signal receiver at a transmission source during uplink in accordance with an embodiment of the present invention.

FIG. 8 illustrates a process 800 performed by a superposition coded signal receiver at a transmission source during uplink in accordance with an embodiment of the present invention. At step 810, a superposition coded signal is received that includes data unique to each of a plurality of users. For example, receiver 200 receives signal y[m] which includes data signals $x_1[m]$ and $x_2[m]$ which are unique to the first and second users and are transmitted by each of two different users (FIG. 2).

At step 820, a first set of test vectors that correspond to a first user are generated by applying a first channel estimate associated with the first user to every bit permutation of the superposition coded signal that corresponds to the first user. For example, data extraction unit 600 may include first test vector generation circuitry 630 which produces either on the fly or retrieves from memory every permutation of the bit positions of the transmitted signal $x_1[m]$ (FIG. 6). The permutations are multiplied by the first channel estimate that is provided by channel estimation circuitry 610 to produce the first set of test vectors for subsequent comparison to the received signal y[m].

At step 830, a second set of test vectors that correspond to a second user are generated by applying a second channel estimate associated with the second user to every bit permutation of the superposition coded signal that corresponds to the second user. For example, data extraction unit 600 may include second test vector generation circuitry 640 which produces either on the fly or retrieves from memory every permutation of the bit positions of the transmitted signal $x_2[m]$ (FIG. 6). The permutations are multiplied by the second channel estimate that is provided by channel estimation circuitry 620 to produce the second set of test vectors for subsequent comparison to the received signal y[m].

At step 840, the data unique to the first user is extracted by locating the received signal values that are nearest to the corresponding first set of test vector values. For example, enhanced LLR computation unit 650 may receive the test vectors (e.g., $h_1[m]x_1[m]$ and $h_2[m]x_2[m]$) and compare their values with the received signal values y[m] (FIG. 6). The enhanced LLR computation unit 650 may compute the LLR values unique to the first user by locating, from the comparison, the values in the received signal that are nearest to the first test vector values as those values have the highest probability of being the data unique to the first user.

Referring now to FIGS. 9A-9E, various exemplary implementations of the present invention are shown.

Figure 9A:
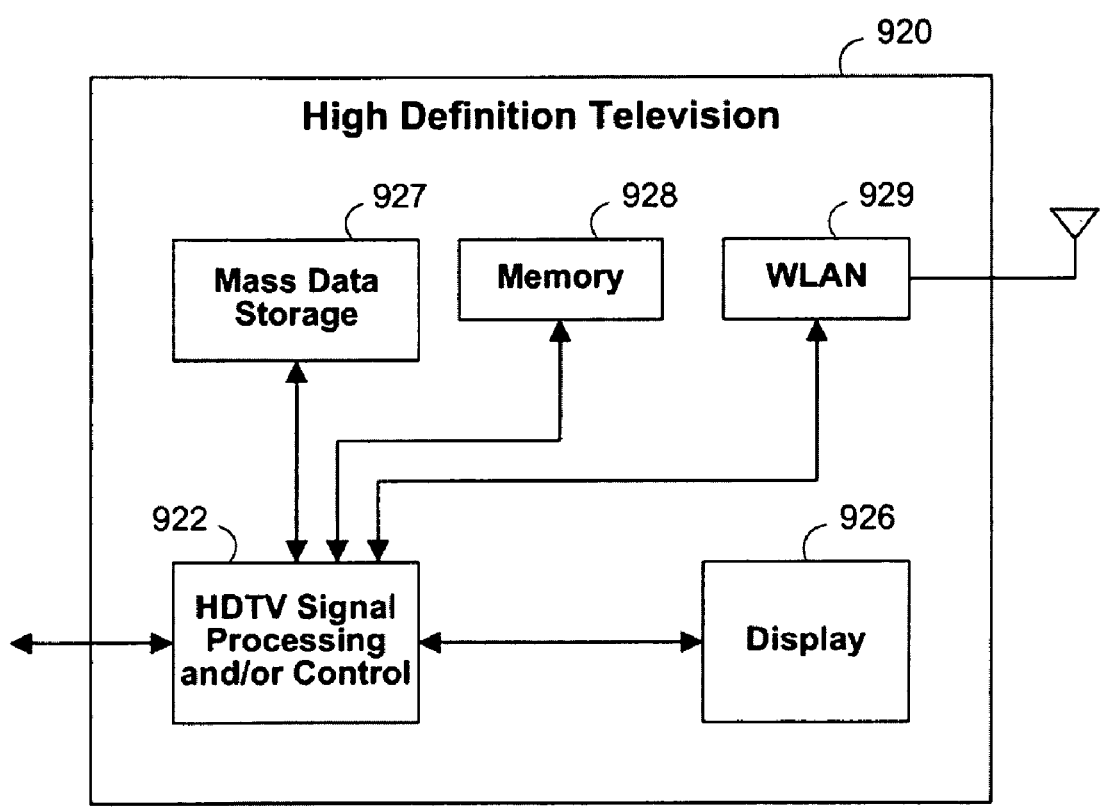
FIG. 9A is a block diagram of an exemplary high definition television that can employ the disclosed technology.

Referring now to FIG. 9A, the present invention can be implemented in a high definition television (HDTV) 920. The present invention may implement either or both signal processing and/or control circuits, which are generally identified in FIG. 9A at 922, a WLAN interface and/or mass data storage of the HDTV 920. The HDTV 920 receives HDTV input signals in either a wired or wireless format and generates HDTV output signals for a display 926. In some implementations, signal processing circuit and/or control circuit 922 and/or other circuits (not shown) of the HDTV 920 may process data, perform coding and/or encryption, perform calculations, format data and/or perform any other type of HDTV processing that may be required.

The HDTV 920 may communicate with mass data storage 927 that stores data in a nonvolatile manner such as optical and/or magnetic storage devices for example hard disk drives and/or DVD drives. The HDD may be a mini HDD that includes one or more platters having a diameter that is smaller than approximately 1.8". The HDTV 920 may be connected to memory 928 such as RAM, ROM, low latency nonvolatile memory such as flash memory and/or other suitable electronic data storage. The HDTV 920 also may support connections with a WLAN via a WLAN interface 929.

Figure 9B:
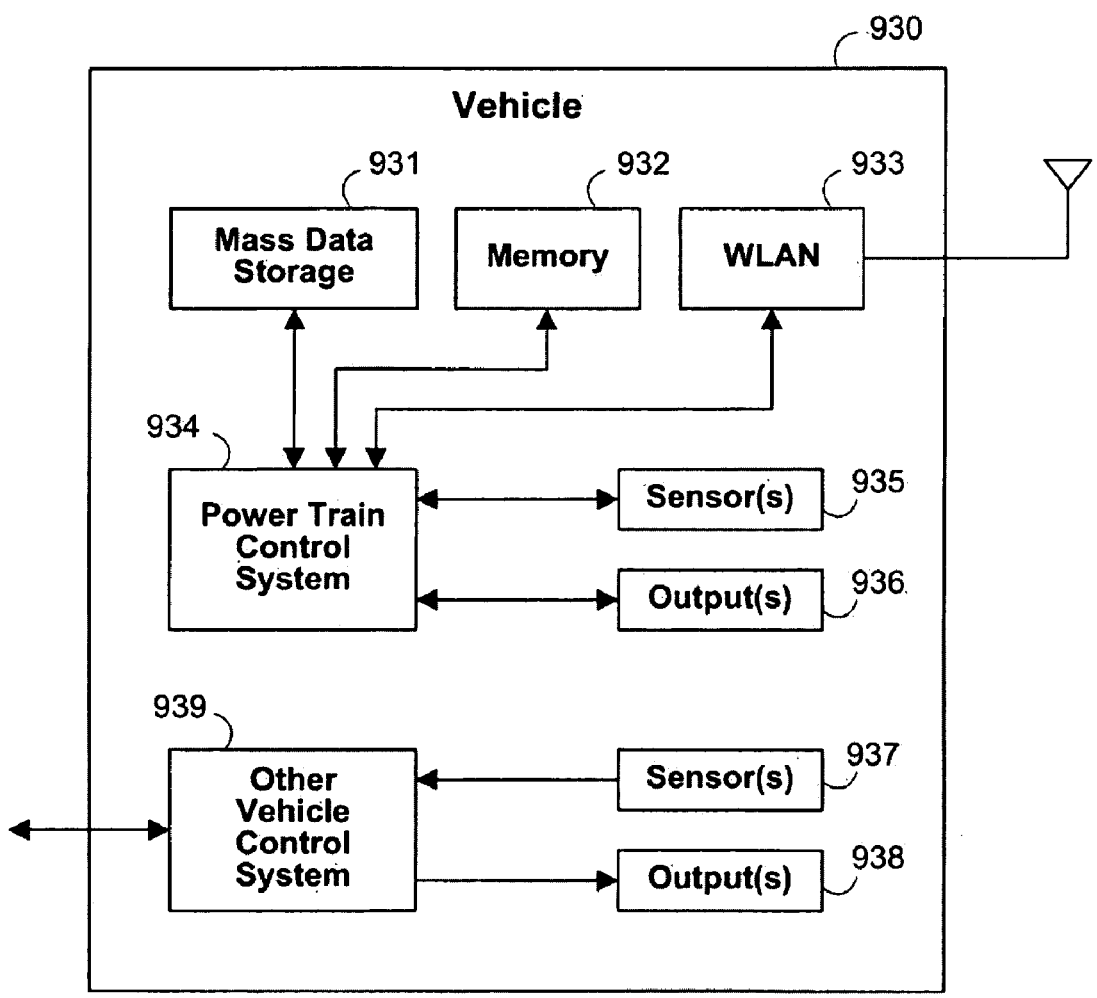
FIG. 9B is a block diagram of an exemplary vehicle that can employ the disclosed technology.

Referring now to FIG. 9B, the present invention implements a control system of a vehicle 930, a WLAN interface and/or mass data storage of the vehicle control system. In some implementations, the present invention may implement a powertrain control system 934 that receives inputs from one or more sensors such as temperature sensors, pressure sensors, rotational sensors, airflow sensors and/or any other suitable sensors and/or that generates one or more output control signals such as engine operating parameters, transmission operating parameters, braking parameters, and/or other control signals.

The present invention may also be implemented in other control systems 939 of the vehicle 930. The control system 939 may likewise receive signals from input sensors 937 and/or output control signals to one or more output devices 938. In some implementations, the control system 939 may be part of an anti-lock braking system (ABS), a navigation system, a telematics system, a vehicle telematics system, a lane departure system, an adaptive cruise control system, a vehicle entertainment system such as a stereo, DVD drive, compact disc drive and the like. Still other implementations are contemplated.

The powertrain control system 934 may communicate with mass data storage 931 that stores data in a nonvolatile manner. The mass data storage 931 may include optical and/or magnetic storage devices for example hard disk drives and/or DVD drives. The HDD may be a mini HDD that includes one or more platters having a diameter that is smaller than approximately 1.8". The powertrain control system 934 may be connected to memory 932 such as RAM, ROM, low latency nonvolatile memory such as flash memory and/or other suitable electronic data storage. The powertrain control system 934 also may support connections with a WLAN via a WLAN interface 933. The control system 939 may also include mass data storage, memory and/or a WLAN interface (all not shown).

Figure 9C:
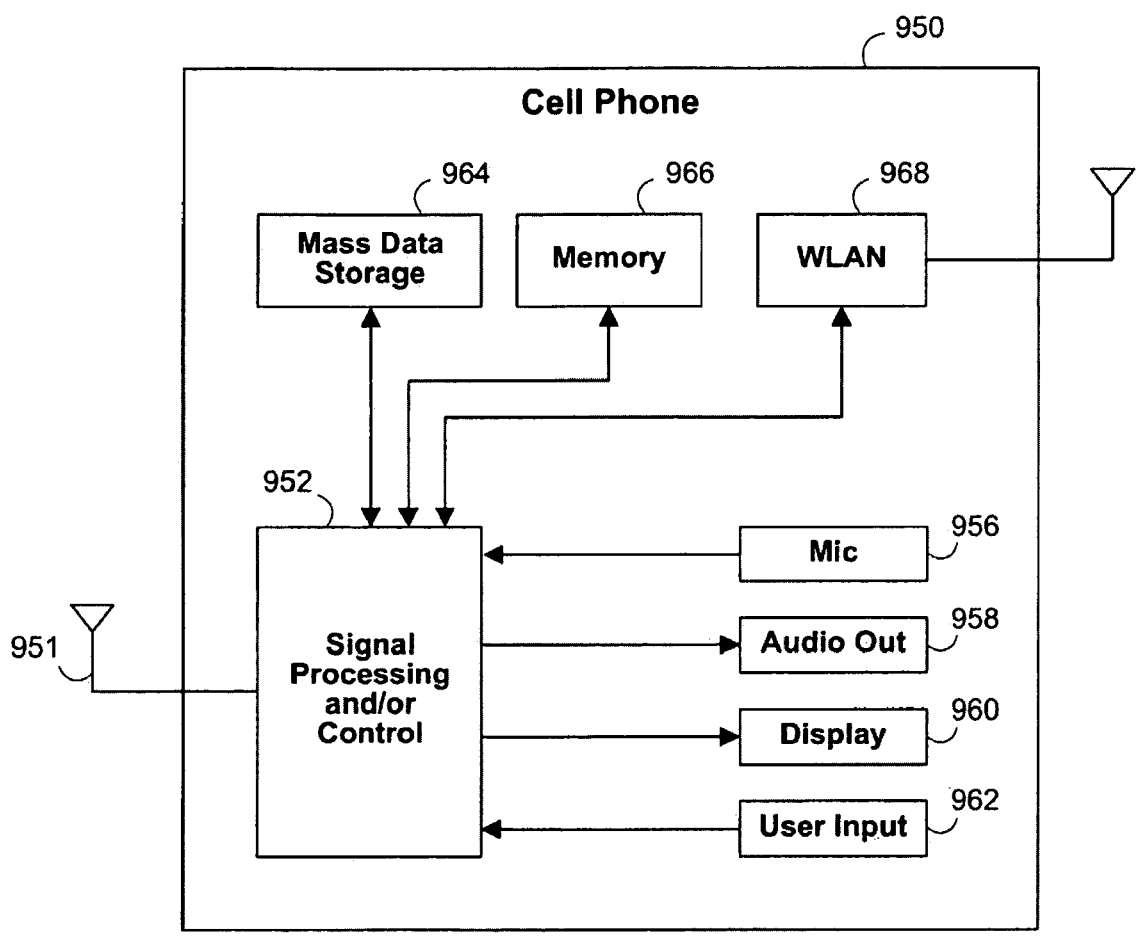
FIG. 9C is a block diagram of an exemplary cell phone that can employ the disclosed technology.

Referring now to FIG. 9C, the present invention can be implemented in a cellular phone 950 that may include a cellular antenna 951. The present invention may implement either or both signal processing and/or control circuits, which are generally identified in FIG. 9C at 952, a WLAN interface and/or mass data storage of the cellular phone 950. In some implementations, the cellular phone 950 includes a microphone 956, an audio output 958 such as a speaker and/or audio output jack, a display 960 and/or an input device 962 such as a keypad, pointing device, voice actuation and/or other input device. The signal processing and/or control circuits 952 and/or other circuits (not shown) in the cellular phone 950 may process data, perform coding and/or encryption, perform calculations, format data and/or perform other cellular phone functions.

The cellular phone 950 may communicate with mass data storage 964 that stores data in a nonvolatile manner such as optical and/or magnetic storage devices for example hard disk drives and/or DVD drives. The HDD may be a mini HDD that includes one or more platters having a diameter that is smaller than approximately 1.8". The cellular phone 950 may be connected to memory 966 such as RAM, ROM, low latency nonvolatile memory such as flash memory and/or other suitable electronic data storage. The cellular phone 950 also may support connections with a WLAN via a WLAN interface 968.

Figure 9D:
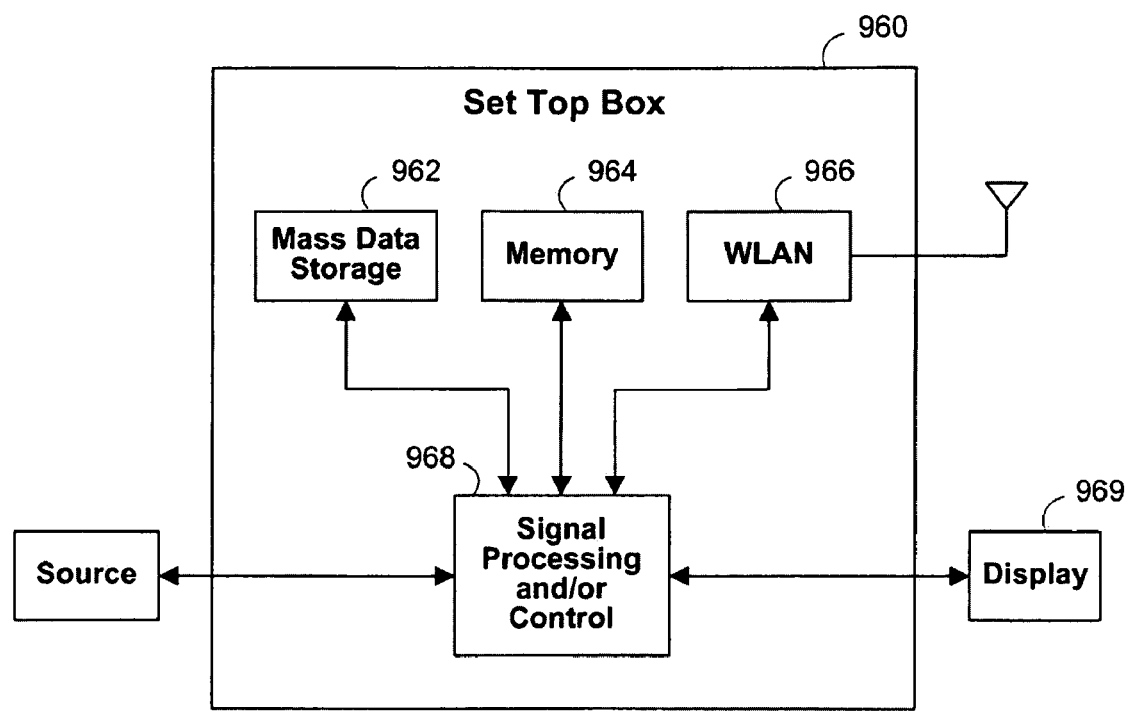
FIG. 9D is a block diagram of an exemplary set top box that can employ the disclosed technology.

Referring now to FIG. 9D, the present invention can be implemented in a set top box 960. The present invention may implement either or both signal processing and/or control circuits, which are generally identified in FIG. 9D at 968, a WLAN interface and/or mass data storage of the set top box 960. The set top box 960 receives signals from a source such as a broadband source and outputs standard and/or high definition audio/video signals suitable for a display 969 such as a television and/or monitor and/or other video and/or audio output devices. The signal processing and/or control circuits 968 and/or other circuits (not shown) of the set top box 960 may process data, perform coding and/or encryption, perform calculations, format data and/or perform any other set top box function.

The set top box 960 may communicate with mass data storage 962 that stores data in a nonvolatile manner. The mass data storage 962 may include optical and/or magnetic storage devices for example hard disk drives and/or DVD drives. The HDD may be a mini HDD that includes one or more platters having a diameter that is smaller than approximately 1.8". The set top box 960 may be connected to memory 964 such as RAM, ROM, low latency nonvolatile memory such as flash memory and/or other suitable electronic data storage. The set top box 960 also may support connections with a WLAN via a WLAN interface 966.

Figure 9E:
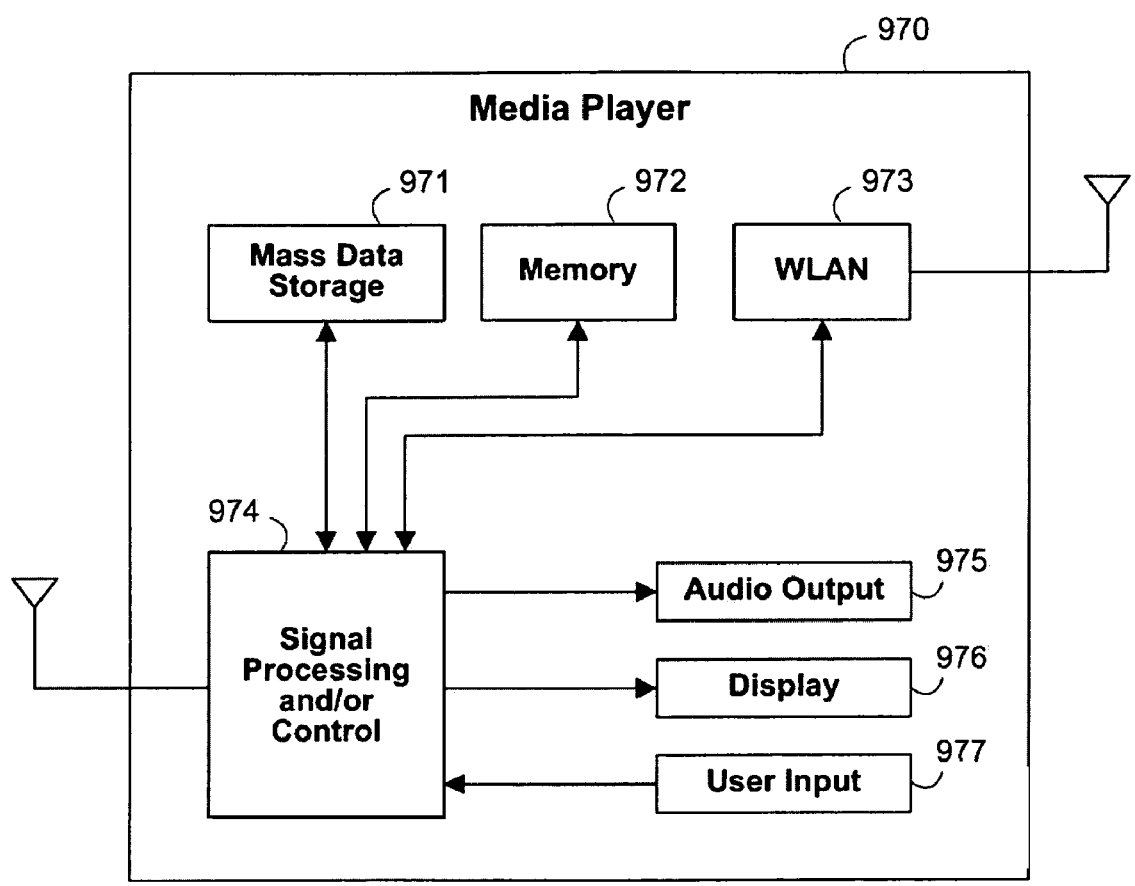
FIG. 9E is a block diagram of an exemplary media player that can employ the disclosed technology.

Referring now to FIG. 9E, the present invention can be implemented in a media player 970. The present invention may implement either or both signal processing and/or control circuits, which are generally identified in FIG. 9E at 974, a WLAN interface and/or mass data storage of the media player 970. In some implementations, the media player 970 includes a display 976 and/or a user input 977 such as a keypad, touchpad and the like. In some implementations, the media player 970 may employ a graphical user interface (GUI) that typically employs menus, drop down menus, icons and/or a point-and-click interface via the display 976 and/or user input 977. The media player 970 further includes an audio output 975 such as a speaker and/or audio output jack. The signal processing and/or control circuits 974 and/or other circuits (not shown) of the media player 970 may process data, perform coding and/or encryption, perform calculations, format data and/or perform any other media player function.

The media player 970 may communicate with mass data storage 971 that stores data such as compressed audio and/or video content in a nonvolatile manner. In some implementations, the compressed audio files include files that are compliant with MP3 format or other suitable compressed audio and/or video formats. The mass data storage 971 may include optical and/or magnetic storage devices for example hard disk drives and/or DVD drives. The HDD may be a mini HDD that includes one or more platters having a diameter that is smaller than approximately 1.8". The media player 970 may be connected to memory 972 such as RAM, ROM, low latency nonvolatile memory such as flash memory and/or other suitable electronic data storage. The media player 970 also may support connections with a WLAN via a WLAN interface 973. Still other implementations in addition to those described above are contemplated.

The foregoing describes systems and methods providing low-complexity receivers for use in superposition coded multi-user systems. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implemented in software.

What is claimed is:

1. A method for extracting data from a superposition coded signal transmitted to a plurality of users, the method comprising:

receiving the superposition coded signal that includes data unique to each of the plurality of users;

generating a first plurality of test vectors corresponding to a first of the plurality of users by applying a channel estimate associated with the first user to every bit permutation of the superposition coded signal; and extracting the data unique to the first user by locating signal values of the received superposition coded signal that are nearest to the corresponding first plurality of test vector values.

2. The method of claim 1 wherein locating the signal values that are nearest to the corresponding first plurality of test vector values comprises computing log-likelihood ratio (LLR) values of a first bit position based on the value of the received signal at the first bit position and the value of a test vector of the first plurality of test vectors at the first bit position.

3. The method of claim 2 wherein the LLR values are computed in accordance with:

$$LLR_k(m, l) = \frac{1}{\sigma_{z_k}^2}\left[\min_{x \in X_l^{(0)}[m]}\{|y_k[m] - h_k[m]x|^2\} - \min_{x \in X_l^{(1)}[m]}\{|y_k[m] - h_k[m]x|^2\}\right]$$

where k identifies a mobile station, m is a time or frequency index, l is a bit position, $\sigma_{z_k}^2$ is a noise estimate, $h_k[m]x$ is the first plurality of test vectors, and y is the received signal.

4. The method of claim 2 wherein the LLR values are computed in accordance with:

$$LLR_k = (m, l) = \log\left(\sum_{x \in X_l^{(1)}[m]} \exp\left(-\frac{|y_k[m] - h_k[m]x|^2}{\sigma_{z_k}^2}\right)\right) - \log\left(\sum_{x \in X_l^{(0)}[m]} \exp\left(-\frac{|y_k[m] - h_k[m]x|^2}{\sigma_{z_k}^2}\right)\right)$$

where k identifies a mobile station, m is a time or frequency index, l is a bit position, $\sigma_{z_k}^2$ is a noise estimate, $h_k[m]x$ is the first plurality of test vectors, $X_l^{(b)}[m]$ is a set of signal constellation points x[m] whose l-th bit position has a value of b, and y is the received signal.

5. The method of claim 1 further comprising:
canceling out interference in the received signal that exists from the presence of the data in the received signal unique to the first user to form a modified received signal; and
extracting the data unique to a second of the plurality of users from the modified received signal.

6. The method of claim 5 wherein canceling out interference comprises:
modulating the extracted data unique to the first user;
applying the channel estimate to the modulated data; and
subtracting the extracted data unique to the first user from the received signal to form the modified received signal.

7. The method of claim 5 wherein extracting the data unique to the second user comprises:
generating a second plurality of test vectors corresponding to the second user by applying a channel estimate associated with the second user to every bit permutation of the superposition coded signal that corresponds to the second user; and extracting the data unique to the second user by locating the signal values of the modified received signal that are nearest to the corresponding second plurality of test vector values.

8. The method of claim 7 wherein locating the signal values of the modified received signal that are nearest to the corresponding second plurality of test vector values comprises computing log-likelihood ratio (LLR) values of a first bit position based on the value of the modified received signal at the first bit position and the value of a test vector of the second plurality of test vectors at the first bit position.

9. The method of claim 8 wherein the LLR values are computed in accordance with:

$$LLR_2(m, l) = \log\left(\sum_{x_2 \in X_{2,l}^{(1)}[m]} \exp\left(-\frac{|y_2[m] - h_2[m](\hat{x}_1[m] + x_2)|^2}{\sigma_{z_2}^2}\right)\right) - \log\left(\sum_{x_2 \in X_{2,l}^{(0)}[m]} \exp\left(\frac{|y_2[m] - h_2[m](\hat{x}_1[m] + x_2)|^2}{\sigma_{z_2}^2}\right)\right)$$

where m is a time or frequency index, l is a bit position, $\sigma_{z_k}^2$ is a noise estimate, $\hat{x}_l[m]$ corresponds to the data unique to the first user based on the first plurality of test vectors, $x_2$ is the second plurality of test vectors, $h_2[m]$ is the channel estimate, $X_{2,l}^{(b)}[m]$ is a set of signal constellation points $x_2[m]$ whose l-th bit position has a value of b, and y is the modified received signal.

10. The method of claim 8 wherein the LLR values are computed in accordance with:

$$LLR_2(m, l) = \frac{1}{\sigma_{z_2}^2}\min_{x_2 \in X_{2,l}^{(0)}[m]}\{|y_2[m] - h_2[m](\hat{x}_1[m] + x_2)|^2\} - \frac{1}{\sigma_{z_2}^2}\min_{x_k \in X_{2,l}^{(1)}[m]}\{|y_2[m] - h_2[m](\hat{x}_1[m] + x_2)|^2\}$$

where m is a time or frequency index, l is a bit position, $\sigma_{z_k}^2$ is a noise estimate, $\hat{x}_1[m]$ corresponds to the data unique to the first user based on the first plurality of test vectors, $x_2$ is the second plurality of test vectors, $h_2[m]$ is the channel estimate, $X_{2,l}^{(b)}[m]$ is a set of signal constellation points $x_2[m]$ whose l-th bit position has a value of b, and y is the modified received signal.

11. The method of claim 1 further comprising:
receiving information bits unique to the plurality of users;
encoding the received information bits;
modulating the encoded information bits;
combining the modulated encoded information bits to produce the superposition coded signal; and
transmitting the superposition coded signal.

12. The method of claim 1 wherein the superposition coded signal is a Quadrature Amplitude Modulation (QAM) signal, a Phase-Shift Keying (PSK) signal, or a signal with a predetermined distribution.

13. The method of claim 1 wherein the first user is a mobile station, a mobile phone, or a computing device.

14. The method of claim 1 wherein the superposition coded signal is transmitted by a base station, a WiMax transmission source, a WiFi transmission source, or a wireless access point.

15. The method of claim 1 wherein the data unique to each of the plurality of users is simultaneously provided in at least one of a same time slot, frequency and code within the superposition coded signal.

16. A method for extracting data from a superposition coded signal transmitted from a plurality of users, the method comprising:
receiving the superposition coded signal that includes data unique to each of the plurality of users;
generating a first plurality of test vectors corresponding to a first of the plurality of users by applying a first channel estimate associated with the first user to every bit permutation of the superposition coded signal that corresponds to the first user;
generating a second plurality of test vectors corresponding to a second of the plurality of users by applying a second channel estimate associated with the second user to every bit permutation of the superposition coded signal that corresponds to the second user; and
extracting the data unique to the first user by locating signal values of the received superposition coded signal that are nearest to the corresponding first plurality of test vector values.

17. The method of claim 16 further comprising extracting the data unique to the second user simultaneously with extracting the data unique to the first user by locating signal values of the received superposition coded signal that are nearest to the corresponding second plurality of test vector values.

18. The method of claim 16 wherein locating the signal values that are nearest to the corresponding first plurality of test vector values comprises computing log-likelihood ratio (LLR) values of a first bit position based on the value of the received signal at the first bit position, the value of a test vector of the first plurality of test vectors at the first bit position, and the value of a test vector of the second plurality of test vectors at the first bit position.

19. The method of claim 18 wherein the LLR values are computed in accordance with:

$$LLR_k(m, l) = \log\left(\sum_{x_k \in X_l^{(1)}[m], x_{\bar{k}} \in X_{\bar{k}}[m]} \exp\left(-\frac{|y[m] - h_1[m]x_1 - h_2[m]x_2|^2}{\sigma_z^2}\right)\right) -$$

$$\log\left(\sum_{x_k \in X_l^{(0)}[m], x_{\bar{k}} \in X_{\bar{k}}[m]} \exp\left(\frac{|y[m] - h_1[m]x_1 - h_2[m]x_2|^2}{\sigma_z^2}\right)\right)$$

where k identifies the mobile station, m is a time or frequency index, l is a bit position, $\sigma_{z_k}^2$ is a noise estimate, $h_1[m]x_1$ is the first plurality of test vectors, $h_2[m]x_2$ is the second plurality of test vectors, $X_l^{(b)}[m]$ is a set of signal constellation points x[m] whose l-th bit position has a value of b, $\bar{k}$ is equal to 1 when k=2 and is equal to 2 when k=1, and y is the received signal.

20. The method of claim 18 wherein the LLR values are computed in accordance with:

$$LLR_k(m, l) = \frac{1}{\sigma_z^2} \min_{x_k \in X_l^{(1)}[m], x_{\bar{k}} \in X_{\bar{k}}[m]} \{|y[m] - h_1[m]x_1 - h_2[m]x_2|^2\} -$$

$$\frac{1}{\sigma_z^2} \min_{x_k \in X_l^{(1)}[m], x_{\bar{k}} \in X_{\bar{k}}[m]} \{|y[m] - h_1[m]x_1 - h_2[m]x_2|^2\}$$

where k identifies the mobile station, m is a time or frequency index, l is a bit position, $\sigma_{z_k}^2$ is a noise estimate, $h_1[m]x_1$ is the first plurality of test vectors, $h_2[m]x_2$ is the second plurality of test vectors, $X_l^{(b)}[m]$ is a set of signal constellation points x[m] whose l-th bit position has a value of b, $\bar{k}$ is equal to 1 when k=2 and is equal to 2 when k=1, and y is the received signal.

21. The method of claim 16 further comprising:
canceling out interference in the received signal that exists from the presence of the data in the received signal unique to the first user to form a modified received signal; and
extracting the data unique to a second of the plurality of users from the modified signal.

22. The method of claim 21 wherein canceling out interference comprises:
modulating the extracted data unique to the first user;
applying the channel estimate corresponding to the first user to the modulated data; and
subtracting the extracted data unique to the first user from the received signal to form the modified received signal.

23. The method of claim 21 wherein extracting the data unique to the second user comprises extracting the data unique to the second user by locating signal values of the modified received signal that are nearest to the corresponding second plurality of test vector values.

24. The method of claim 16 further comprising:
transmitting a first data signal from the first user through a first channel having a channel characteristic corresponding to the first channel estimate;
transmitting a second data signal from the second user through a second channel having a channel characteristic corresponding to the second channel estimate; and
combining the first and second data signals transmitted over the first and second channels to form the superposition coded signal.

25. The method of claim 16 wherein the superposition coded signal is a Quadrature Amplitude Modulation (QAM) signal, a Phase-Shift Keying (PSK) signal, or a signal with a predetermined distribution.

26. The method of claim 16 wherein:
the first user is a mobile station, a mobile phone or a computing device, the second user is a mobile station, a mobile phone or a computing device, and
the superposition coded signal is received by a transmission source, wherein the transmission source is a base station, a mobile phone antenna, or a wireless access point.

27. The method of claim 16 wherein the data unique to each of the plurality of users is simultaneously provided in at least one of a same time slot, frequency and code within the superposition coded signal.

28. A system for extracting data from a superposition coded signal transmitted to a plurality of users, the system comprising:
a receiver configured to receive the superposition coded signal that includes data unique to each of the plurality of users; and
control circuitry configured to:

generate a first plurality of test vectors corresponding to a first of the plurality of users by applying a channel estimate associated with the first user to every bit permutation of the superposition coded signal; and extract the data unique to the first user by locating signal values of the received superposition coded signal that are nearest to the corresponding first plurality of test vector values.

29. The system of claim 28 wherein the control circuitry is further configured to compute log-likelihood ratio (LLR) values of a first bit position based on the value of the received signal at the first bit position and the value of a test vector of the first plurality of test vectors at the first bit position.

30. The system of claim 29 wherein the LLR values are computed in accordance with:

$$LLR_k(m, l) = \frac{1}{\sigma_{z_k}^2}\left[\min_{x \in X_l^{(0)}[m]} \{|y_k[m] - h_k[m]x|^2\} - \min_{x \in X_l^{(1)}[m]} \{|y_k[m] - h_k[m]x|^2\}\right]$$

where k identifies a mobile station, m is a time or frequency index, l is a bit position, $\sigma_{z_k}^2$ is a noise estimate, $h_k[m]x$ is the first plurality of test vectors, $X_l^{(b)}[m]$ is a set of signal constellation points $x[m]$ whose l-th bit position has a value of b, and y is the received signal.

31. The system of claim 29 wherein the LLR values are computed in accordance with:

$$LLR_k = (m, l) = \log\left(\sum_{x \in X_l^{(1)}[m]} \exp\left(-\frac{|y_k[m] - h_k[m]x|^2}{\sigma_{z_k}^2}\right)\right) - \log\left(\sum_{x \in X_l^{(0)}[m]} \exp\left(-\frac{|y_k[m] - h_k[m]x|^2}{\sigma_{z_k}^2}\right)\right)$$

where k identifies a mobile station, m is a time or frequency index, l is a bit position, $\sigma_{z_k}^2$ is a noise estimate, $h_k[m]x$ is the first plurality of test vectors, $X_l^{(b)}[m]$ is a set of signal constellation points $x[m]$ whose l-th bit position has a value of b, and y is the received signal.

32. The system of claim 28 wherein the control circuitry is further configured to:
cancel out interference in the received signal that exists from the presence of the data in the received signal unique to the first user to form a modified received signal; and
extract the data unique to a second of the plurality of users from the modified received signal.

33. The system of claim 32 wherein the control circuitry is further configured to:
modulate the extracted data unique to the first user;
apply the channel estimate to the modulated data; and
subtract the extracted data unique to the first user from the received signal to form the modified received signal.

34. The system of claim 32 wherein the control circuitry is further configured to:
generate a second plurality of test vectors corresponding to the second user by applying a channel estimate associated with the second user to every bit permutation of the superposition coded signal that corresponds to the second user; and extract the data unique to the second user by locating signal values of the modified received signal that are nearest to the corresponding second plurality of test vector values.

35. The system of claim 34 wherein the control circuitry is further configured to compute log-likelihood ratio (LLR) values of a first bit position based on the value of the modified received signal at the first bit position and the value of a test vector of the second plurality of test vectors at the first bit position.

36. The system of claim 35 wherein the LLR values are computed in accordance with:

$$LLR_2(m, l) = \log\left(\sum_{x_2 \in X_{2,l}^{(1)}[m]} \exp\left(-\frac{|y_2[m] - h_2[m](\hat{x}_1[m] + x_2)|^2}{\sigma_{z_2}^2}\right)\right) - \log\left(\sum_{x_2 \in X_{2,l}^{(0)}[m]} \exp\left(-\frac{|y_2[m] - h_2[m](\hat{x}_1[m] + x_2)|^2}{\sigma_{z_2}^2}\right)\right)$$

where m is a time or frequency index, l is a bit position, $\sigma_{z_2}^2$ is a noise estimate, $\hat{x}_1[m]$ corresponds to the data unique to the first user based on the first plurality of test vectors, $x_2$ is the second plurality of test vectors, $h_2[m]$ is the channel estimate, $X_{2,l}^{(b)}[m]$ is a set of signal constellation points $x_2[m]$ whose l-th bit position has a value of b, and y is the modified received signal.

37. The system of claim 35 wherein the LLR values are computed in accordance with:

$$LLR_2(m, l) = \frac{1}{\sigma_{z_2}^2} \min_{x_2 \in X_{2,l}^{(0)}[m]} \{|y_2[m] - h_2[m](\hat{x}_1[m] + x_2)|^2\} - \frac{1}{\sigma_{z_2}^2} \min_{x_k \in X_{2,l}^{(1)}[m]} \{|y_2[m] - h_2[m](\hat{x}_1[m] + x_2)|^2\}$$

where m is a time or frequency index, l is a bit position, $\sigma_{z_k}^2$ is a noise estimate, $\hat{x}_1[m]$ corresponds to the data unique to the first user based on the first plurality of test vectors, $x_2$ is the second plurality of test vectors, $h_2[m]$ is the channel estimate, $X_{2,l}^{(b)}[m]$ is a set of signal constellation points $x_2[m]$ whose l-th bit position has a value of b, and y is the modified received signal.

38. The system of claim 28 further comprising:
processing circuitry configured to:
receive information bits unique to the plurality of users;
encode the received information bits;
modulate the encoded information bits;
combine the modulated encoded information bits to produce the superposition coded signal; and
a transmission device operative to transmit the superposition coded signal.

39. The system of claim 28 wherein the superposition coded signal is a Quadrature Amplitude Modulation (QAM) signal, a Phase-Shift Keying (PSK) signal, or a signal with a predetermined distribution.

40. The system of claim 28 wherein the first user is a mobile station, a mobile phone, or a computing device.

41. The system of claim 28 wherein the superposition coded signal is transmitted by a base station, a WiMax transmission source, a WiFi transmission source, or a wireless access point.

42. The system of claim 28 wherein the data unique to each of the plurality of users is simultaneously provided in at least one of a same time slot, frequency and code within the superposition coded signal.

43. A system for extracting data from a superposition coded signal transmitted from a plurality of users, the system comprising:
a receiver configured to receive the superposition coded signal that includes data unique to each of the plurality of users; and
control circuitry configured to:
generate a first plurality of test vectors corresponding to a first of the plurality of users by applying a first channel estimate associated with the first user to every bit permutation of the superposition coded signal that corresponds to the first user;
generate a second plurality of test vectors corresponding to a second of the plurality of users by applying a second channel estimate associated with the second user to every bit permutation of the superposition coded signal that corresponds to the second user; and
extract the data unique to the first user by locating signal values of the received superposition coded signal that are nearest to the corresponding first plurality of test vector values.

44. The system of claim 43 wherein the control circuitry is further configured to extract the data unique to the second user simultaneously with the data unique to the first user by locating signal values of the received superposition coded signal that are nearest to the corresponding second plurality of test vector values.

45. The system of claim 43 wherein the control circuitry is further configured to compute log-likelihood ratio (LLR) values of a first bit position based on the value of the received signal at the first bit position, the value of a test vector of the first plurality of test vectors at the first bit position, and the value of a test vector of the second plurality of test vectors at the first bit position.

46. The system of claim 45 wherein the LLR values are computed in accordance with:

$$LLR_k(m, l) = \log\left(\sum_{x_k \in X_l^{(1)}[m], x_{\bar{k}} \in X_{\bar{k}}[m]} \exp\left(-\frac{|y[m] - h_1[m]x_1 - h_2[m]x_2|^2}{\sigma_z^2}\right)\right) - \log\left(\sum_{x_k \in X_l^{(0)}[m], x_{\bar{k}} \in X_{\bar{k}}[m]} \exp\left(\frac{|y[m] - h_1[m]x_1 - h_2[m]x_2|^2}{\sigma_z^2}\right)\right)$$

where k identifies the mobile station, m is a time or frequency index, l is a bit position, $\sigma_{z_k}^2$ is a noise estimate, $h_1[m]x_1$ is the first plurality of test vectors, $h_2[m]x_2$ is the second plurality of test vectors, $X_l^{(b)}[m]$ is a set of signal constellation points x[m] whose l-th bit position has a value of b, $\bar{k}$ is equal to 1 when k=2 and is equal to 2 when k=1, and y is the received signal.

47. The system of claim 45 wherein the LLR values are computed in accordance with:

$$LLR_k(m, l) = \frac{1}{\sigma_z^2} \min_{x_k \in X_l^{(0)}[m], x_{\bar{k}} \in X_{\bar{k}}[m]} \{|y[m] - h_1[m]x_1 - h_2[m]x_2|^2\} - \frac{1}{\sigma_z^2} \min_{x_k \in X_l^{(1)}[m], x_{\bar{k}} \in X_{\bar{k}}[m]} \{|y[m] - h_1[m]x_1 - h_2[m]x_2|^2$$

where k identifies a mobile station, m is a time or frequency index, l is a bit position, $\sigma_{z_k}^2$ is a noise estimate, $h_1[m]x_1$ is the first plurality of test vectors, $h_2[m]x_2$ is the second plurality of test vectors, and y is the received signal.

48. The system of claim 43 wherein the control circuitry is further configured to:
cancel out interference in the received signal that exists from the presence of the data in the received signal unique to the first user to form a modified received signal; and
extract the data unique to a second of the plurality of users from the modified signal.

49. The system of claim 48 wherein the control circuitry is further configured to:
modulate the extracted data unique to the first user;
apply the channel estimate corresponding to the first user to the modulated data; and
subtract the extracted data unique to the first user from the received signal to form the modified received signal.

50. The system of claim 48 wherein the control circuitry is further configured to extract the data unique to the second user by locating signal values of the modified received signal that are nearest to the corresponding second plurality of test vector values.

51. The system of claim 43 further comprising:
a first transmission device operative to transmit a first data signal from the first user through a first channel having a channel characteristic corresponding to the first channel estimate; and
a second transmission device operative to transmit a second data signal from the second user through a second channel having a channel characteristic corresponding to the second channel estimate;
wherein the control circuitry is further configured to combine the first and second data signals transmitted over the first and second channels to form the superposition coded signal.

52. The system of claim 43 wherein the superposition coded signal is a Quadrature Amplitude Modulation (QAM) signal, a Phase-Shift Keying (PSK) signal, or a signal with a predetermined distribution.

53. The system of claim 43 wherein:
the first user is a mobile station, a mobile phone or a computing device, the second user is a mobile station, a mobile phone or a computing device, and
the superposition coded signal is received by a transmission source, wherein the transmission source is a base station, a mobile phone antenna, or a wireless access point.

54. The system of claim 43 wherein the data unique to each of the plurality of users is simultaneously provided in at least one of a same time slot, frequency and code within the superposition coded signal.

* * * * *